US011586915B2

(12) United States Patent
Macready et al.

(10) Patent No.: US 11,586,915 B2
(45) Date of Patent: Feb. 21, 2023

(54) SYSTEMS AND METHODS FOR COLLABORATIVE FILTERING WITH VARIATIONAL AUTOENCODERS

(71) Applicant: D-WAVE SYSTEMS INC., Burnaby (CA)

(72) Inventors: William G. Macready, West Vancouver (CA); Jason T. Rolfe, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 149 days.

(21) Appl. No.: 16/772,094

(22) PCT Filed: Dec. 12, 2018

(86) PCT No.: PCT/US2018/065286
§ 371 (c)(1),
(2) Date: Jun. 11, 2020

(87) PCT Pub. No.: WO2019/118644
PCT Pub. Date: Jun. 20, 2019

(65) Prior Publication Data
US 2021/0089884 A1    Mar. 25, 2021

Related U.S. Application Data

(60) Provisional application No. 62/658,461, filed on Apr. 16, 2018, provisional application No. 62/598,880, filed on Dec. 14, 2017.

(51) Int. Cl.
*G06N 3/08* (2006.01)
*G06N 10/00* (2022.01)
(Continued)

(52) U.S. Cl.
CPC ............. *G06N 3/08* (2013.01); *G06K 9/6257* (2013.01); *G06N 3/0454* (2013.01); *G06N 10/00* (2019.01)

(58) Field of Classification Search
CPC ........ G06N 3/08; G06N 3/0454; G06N 10/00; G06N 3/0472; G06K 9/6257
See application file for complete search history.

(56) References Cited

U.S. PATENT DOCUMENTS

| 5,249,122 A | 9/1993 | Stritzke |
| 6,424,933 B1 | 7/2002 | Agrawala et al. |
| (Continued) | | |

FOREIGN PATENT DOCUMENTS

| CN | 101473346 A | 7/2009 |
| CN | 101657827 A | 2/2010 |
| (Continued) | | |

OTHER PUBLICATIONS

Awasthi et al., "Efficient Learning of Linear Separators under Bounded Noise" Mar. 12, 2015, arXiv: 1503.03594v1, pp. 1-23. (Year: 2015).

(Continued)

*Primary Examiner* — Nghia M Doan
(74) *Attorney, Agent, or Firm* — Cozen O'Connor

(57) ABSTRACT

Collaborative filtering systems based on variational autoencoders (VAEs) are provided. VAEs may be trained on row-wise data without necessarily training a paired VAE on column-wise data (or vice-versa), and may optionally be trained via minibatches. The row-wise VAE models the output of the corresponding column-based VAE as a set of parameters and uses these parameters in decoding. In some implementations, a paired VAE is provided which receives column-wise data and models row-wise parameters; each of the paired VAEs may bind their learned column- or row-wise parameters to the output of the corresponding VAE. The paired VAEs may optionally be trained via minibatches. Unobserved data may be explicitly modelled. Methods for performing inference with such VAE-based collaborative (Continued)

filtering systems are also disclosed, as are example applications to search and anomaly detection.

20 Claims, 6 Drawing Sheets

(51) Int. Cl.
  *G06K 9/62* (2022.01)
  *G06N 3/04* (2023.01)

(56) References Cited

U.S. PATENT DOCUMENTS

| | | |
|---|---|---|
| 6,671,661 B1 | 12/2003 | Bishop |
| 7,135,701 B2 | 11/2006 | Amin et al. |
| 7,418,283 B2 | 8/2008 | Amin |
| 7,493,252 B1 | 2/2009 | Nagano et al. |
| 7,533,068 B2 | 5/2009 | Maassen et al. |
| 7,876,248 B2 | 1/2011 | Berkley et al. |
| 8,008,942 B2 | 8/2011 | Van et al. |
| 8,035,540 B2 | 10/2011 | Berkley et al. |
| 8,073,808 B2 | 12/2011 | Rose |
| 8,190,548 B2 | 5/2012 | Choi |
| 8,195,596 B2 | 6/2012 | Rose et al. |
| 8,244,650 B2 | 8/2012 | Rose |
| 8,340,439 B2 | 12/2012 | Mitarai et al. |
| 8,421,053 B2 | 4/2013 | Bunyk et al. |
| 8,548,828 B1 | 10/2013 | Longmire |
| 8,560,282 B2 | 10/2013 | Love et al. |
| 8,863,044 B1 | 10/2014 | Casati et al. |
| 9,378,733 B1 | 6/2016 | Vanhoucke et al. |
| 9,495,644 B2 | 11/2016 | Chudak et al. |
| 9,727,824 B2 | 8/2017 | Rose et al. |
| 9,881,256 B2 | 1/2018 | Hamze et al. |
| 10,296,846 B2 | 5/2019 | Csurka et al. |
| 10,318,881 B2 | 6/2019 | Rose et al. |
| 10,339,466 B1 | 7/2019 | Ding et al. |
| 10,817,796 B2 | 10/2020 | Macready et al. |
| 11,157,817 B2 | 10/2021 | Rolfe |
| 2002/0010691 A1 | 1/2002 | Chen |
| 2002/0077756 A1 | 6/2002 | Arouh et al. |
| 2003/0030575 A1 | 2/2003 | Frachtenberg et al. |
| 2005/0119829 A1 | 6/2005 | Bishop et al. |
| 2006/0041421 A1 | 2/2006 | Ta et al. |
| 2006/0047477 A1 | 3/2006 | Bachrach |
| 2006/0074870 A1 | 4/2006 | Brill et al. |
| 2006/0115145 A1 | 6/2006 | Bishop et al. |
| 2007/0011629 A1 | 1/2007 | Shacham et al. |
| 2007/0162406 A1 | 7/2007 | Lanckriet |
| 2008/0069438 A1 | 3/2008 | Winn et al. |
| 2008/0103996 A1 | 5/2008 | Forman et al. |
| 2008/0132281 A1 | 6/2008 | Kim et al. |
| 2008/0176750 A1 | 7/2008 | Rose et al. |
| 2008/0215850 A1 | 9/2008 | Berkley et al. |
| 2008/0312663 A1 | 12/2008 | Haimerl et al. |
| 2008/0313430 A1 | 12/2008 | Bunyk |
| 2009/0077001 A1 | 3/2009 | Macready et al. |
| 2009/0121215 A1 | 5/2009 | Choi |
| 2009/0171956 A1 | 7/2009 | Gupta et al. |
| 2009/0254505 A1 | 10/2009 | Davis et al. |
| 2009/0278981 A1 | 11/2009 | Bruna et al. |
| 2009/0322871 A1 | 12/2009 | Ji et al. |
| 2010/0010657 A1 | 1/2010 | Do et al. |
| 2010/0185422 A1 | 7/2010 | Hoversten |
| 2010/0228694 A1 | 9/2010 | Le et al. |
| 2010/0332423 A1 | 12/2010 | Kapoor et al. |
| 2011/0022369 A1 | 1/2011 | Carroll et al. |
| 2011/0022820 A1 | 1/2011 | Bunyk et al. |
| 2011/0044524 A1 | 2/2011 | Wang et al. |
| 2011/0047201 A1 | 2/2011 | Macready et al. |
| 2011/0142335 A1 | 6/2011 | Ghanem et al. |
| 2011/0231462 A1 | 9/2011 | Macready et al. |
| 2011/0238378 A1 | 9/2011 | Allen et al. |
| 2011/0295845 A1 | 12/2011 | Gao et al. |
| 2012/0084235 A1 | 4/2012 | Suzuki et al. |
| 2012/0124432 A1 | 5/2012 | Pesetski et al. |
| 2012/0149581 A1 | 6/2012 | Fang |
| 2012/0215821 A1 | 8/2012 | Macready et al. |
| 2012/0254586 A1 | 10/2012 | Amin et al. |
| 2013/0071837 A1 | 3/2013 | Winters-Hilt et al. |
| 2013/0097103 A1 | 4/2013 | Chari et al. |
| 2013/0236090 A1 | 9/2013 | Porikli et al. |
| 2013/0245429 A1 | 9/2013 | Zhang et al. |
| 2014/0025606 A1 | 1/2014 | Macready |
| 2014/0040176 A1 | 2/2014 | Balakrishnan et al. |
| 2014/0152849 A1 | 6/2014 | Bala et al. |
| 2014/0187427 A1 | 7/2014 | Macready et al. |
| 2014/0200824 A1 | 7/2014 | Pancoska |
| 2014/0201208 A1 | 7/2014 | Satish et al. |
| 2014/0214835 A1 | 7/2014 | Oehrle et al. |
| 2014/0214836 A1 | 7/2014 | Stivoric et al. |
| 2014/0279727 A1 | 9/2014 | Baraniuk et al. |
| 2014/0297235 A1 | 10/2014 | Arora et al. |
| 2015/0006443 A1 | 1/2015 | Rose et al. |
| 2015/0161524 A1 | 6/2015 | Hamze |
| 2015/0205759 A1 | 7/2015 | Israel et al. |
| 2015/0242463 A1 | 8/2015 | Lin et al. |
| 2015/0248586 A1 | 9/2015 | Gaidon et al. |
| 2015/0269124 A1 | 9/2015 | Hamze et al. |
| 2015/0317558 A1 | 11/2015 | Adachi et al. |
| 2016/0019459 A1 | 1/2016 | Audhkhasi et al. |
| 2016/0042294 A1* | 2/2016 | Macready ............. G06N 5/02 706/10 |
| 2016/0078359 A1 | 3/2016 | Csurka et al. |
| 2016/0078600 A1 | 3/2016 | Perez Pellitero et al. |
| 2016/0110657 A1 | 4/2016 | Gibiansky et al. |
| 2016/0174902 A1 | 6/2016 | Georgescu et al. |
| 2016/0180746 A1 | 6/2016 | Coombes et al. |
| 2016/0191627 A1 | 6/2016 | Huang et al. |
| 2016/0253597 A1 | 9/2016 | Bhatt et al. |
| 2016/0307305 A1 | 10/2016 | Madabhushi et al. |
| 2016/0328253 A1 | 11/2016 | Majumdar |
| 2017/0132509 A1 | 5/2017 | Li et al. |
| 2017/0147944 A1 | 5/2017 | Csurka et al. |
| 2017/0161633 A1 | 6/2017 | Clinchant et al. |
| 2017/0255871 A1 | 9/2017 | Macready et al. |
| 2017/0300817 A1 | 10/2017 | King et al. |
| 2018/0018584 A1 | 1/2018 | Nock et al. |
| 2018/0025291 A1 | 1/2018 | Dey et al. |
| 2018/0082172 A1 | 3/2018 | Patel et al. |
| 2018/0101784 A1 | 4/2018 | Rolfe et al. |
| 2018/0137422 A1 | 5/2018 | Wiebe et al. |
| 2018/0150728 A1 | 5/2018 | Vahdat |
| 2018/0157923 A1 | 6/2018 | El Kaliouby et al. |
| 2018/0165554 A1 | 6/2018 | Zhang et al. |
| 2018/0165601 A1 | 6/2018 | Wiebe et al. |
| 2018/0277246 A1 | 9/2018 | Zhong et al. |
| 2019/0005402 A1 | 1/2019 | Mohseni et al. |
| 2019/0018933 A1 | 1/2019 | Oono et al. |
| 2019/0030078 A1 | 1/2019 | Aliper et al. |
| 2019/0050534 A1 | 2/2019 | Apte et al. |
| 2019/0108912 A1 | 4/2019 | Spurlock |
| 2019/0122404 A1 | 4/2019 | Freeman et al. |
| 2019/0180147 A1 | 6/2019 | Zhang et al. |
| 2019/0258907 A1 | 8/2019 | Rezende et al. |
| 2019/0258952 A1 | 8/2019 | Denchev |
| 2020/0167691 A1 | 5/2020 | Golovin et al. |
| 2020/0226197 A1 | 7/2020 | Woerner et al. |
| 2020/0234172 A1 | 7/2020 | King et al. |
| 2020/0311589 A1 | 10/2020 | Ollitrault et al. |
| 2020/0410384 A1 | 12/2020 | Aspuru-Guzik et al. |
| 2021/0279631 A1 | 9/2021 | Pichler et al. |
| 2022/0101170 A1 | 3/2022 | Denchev |

FOREIGN PATENT DOCUMENTS

| | | |
|---|---|---|
| CN | 102364497 A | 2/2012 |
| CN | 102651073 A | 8/2012 |
| CN | 102831402 A | 12/2012 |
| CN | 102324047 B | 6/2013 |
| CN | 102364497 B | 6/2013 |
| CN | 104050509 A | 9/2014 |
| CN | 102037475 B | 5/2015 |
| CN | 104766167 A | 7/2015 |

(56) References Cited

FOREIGN PATENT DOCUMENTS

| | | | | |
|---|---|---|---|---|
| CN | 104919476 | A | 9/2015 | |
| CN | 106569601 | A | 4/2017 | |
| CN | 112771549 | A | 5/2021 | |
| JP | 2011008631 | A | 1/2011 | |
| KR | 20130010181 | A | 1/2013 | |
| WO | 2009120638 | A2 | 10/2009 | |
| WO | 2010071997 | A1 | 7/2010 | |
| WO | 2015193531 | A1 | 12/2015 | |
| WO | 2016029172 | A1 | 2/2016 | |
| WO | 2016037300 | A1 | 3/2016 | |
| WO | 2016089711 | A1 | 6/2016 | |
| WO | 2016210018 | A1 | 12/2016 | |
| WO | 2017031356 | A1 | 2/2017 | |
| WO | 2017031357 | A1 | 2/2017 | |
| WO | WO-2017031356 | A1 * | 2/2017 | ............. G06N 10/00 |
| WO | 2017066695 | A1 | 4/2017 | |
| WO | 2017124299 | A1 | 7/2017 | |
| WO | 2017132545 | A1 | 8/2017 | |
| WO | WO-2019118644 | A1 * | 6/2019 | ........... G06K 9/6257 |
| WO | 2020163455 | A1 | 8/2020 | |

OTHER PUBLICATIONS

Awasthi et al., "Learning and 1-bit Compressed Sensing under Asymmetric Noise" Jun. 6, 2016, JMLR, pp. 1-41. (Year 2016).
Bach et al., "On the Equivalence between Herding and Conditional Gradient Algorithms," Proceedings of the 29th International Conference on Machine Learning, 2012, 8 pages.
Bach, F. et al., "Optimization with Sparsity-Inducing Penalties," arXiv:1108.0775v2 [cs.LG], Nov. 22, 2011, 116 pages.
Benedetti et al., "Quantum-assisted learning of graphical models with arbitrary pairwise connectivity" Sep. 8, 2016, arXiv: 1609.02542v1, pp. 1-13. (Year: 2016).
Berkley, A.J. et al., "Tunneling Spectroscopy Using a Probe Qubit," arXiv:1210.6310v2 [cond-mat.supr-con], Jan. 3, 2013, 5 pages.
Blanchard et al., "Classification with Asymmetric Label Noise: Consistency and Maximal Denoising" Aug. 5, 2016, arXiv: 1303.1208v3, pp. 1-47. (Year: 2016).
Bornschein et al., "Bidirectional Helmholtz Machines" May 25, 2016, arXiv: 1506.03877v5. (Year: 2016).
Brakel, P., Dieleman, S., & Schrauwen. "Training restricted Boltzmann machines with multi-tempering: Harnessing parallelization", 2012.
Chen et al., "Herding as a Learning System with Edge-of-Chaos Dynamics," arXiv:1602.030142V2 [stat.ML], Mar. 1, 2016, 48 pages.
Chen et al., "Parametric Herding," Proceedings of the 13th International Conference on Artificial Intelligence and Statistics (AISTATS), 2010, pp. 97-104.
Chinese Office Action for Application No. CN 2016800606343, dated May 8, 2021, 21 pages (with English translation).
Courville, A. et al., "A Spike and Slab Restricted Boltzmann Machine," Proceedings of the 14th International Conference on Artificial Intelligence and Statistics (AISTATS), 2011, 9 pages.
Deng, J. et al., "ImageNet: A Large-Scale Hierarchical Image Database," Proceedings / CVPR, IEEE Computer Society Conference on Computer Vision and Pattern Recognition, 2009, 8 pages.
Desjardins, G., Courville, A., Bengio, Y., Vincent, P., & Delalleau, O. "Parallel tempering for training of restricted Boltzmann machines", 2010.
Dumoulin, V. et al., "On the Challenges of Physical Implementations of RBMs," Proceedings of the 28th AAAI Conference on Artificial Intelligence, vol. 2, Jul. 27, 2014, 7 pages.
Elkan, C., "Learning Classifiers from Only Positive and Unlabeled Data," KDD08: The 14th ACM SIGKDD International Conference on Knowledge Discovery and Data Mining Las Vegas Nevada USA Aug. 24-27, 2008, 8 pages.
Extended European Search Report for EP Application No. 16837862.8,dated Apr. 3, 2019, 12 pages.

Fergus, R. et al., "Semi-Supervised Learning in Gigantic Image Collections," Advances in Neural Information Processing Systems, vol. 22, 2009, 8 pages.
First Office Action dated Nov. 29, 2021 in CN App No. 2016800731803. (English Translation).
First Office Action issued in Chinese No. 2018101287473 with English translation, dated Jul. 12, 2021, 16 pages.
Freidman, et al., "Learning Bayesian Networks from Data", Internet Movie Database, http://www.imdb.com, 19 pages.
Freund, Y. et al., "Large Margin Classification Using the Perceptron Algorithm," Machine Learning 37(3), 1999, 19 pages.
Fung, G. et al., "Parameter Free Bursty Events Detection in Text Streams," Proceedings of the 31st VLDB Conference, Trondheim, Norway, 2005, 12 pages.
Geordie, "First Ever DBM Trained Using a Quantum Computer," URL:https://dwave.wordpress.com/2014/01/06 /first-ever-dbm-trained-using-a-quantum-computer/, Jan. 6, 2014, 8 pages.
Geordie, "Training DBMs with Physical neural nets" In Hack The Multiverse, Jan. 24, 2014, pp. 2-5.
Grassberger, "Entropy Estimates from Insufficient Samplings," arXiv:physics/0307138v2 [physics.data-an], Jan. 4, 2008, 5 pages.
Gómez-Bombarelli et al., "Automatic Chemical Design Using a Data-Driven Continuous Representation of Molecules," arXiv:1610.02415v3: Dec. 2017. (26 pages).
Goodfellow et al., "Generative Adversarial Nets", arXiv:1406.2661v1 [stat.ML], 9 pages, Jun. 10, 2014.
"An implementation of the high-throughput computing system using the GPU (005)", no English translations, 2019-516164, IEICE Technical Report, vol. 114 No. 302, Nov. 13-14, 2014 , 12 pages.
"Cluster Analysis", UIUC, 2013.
"Neuro-computing for Parallel and Learning Information Systems", 2019-516164, www.jstage.jst.go.jp/article/sicej/1962/27/3/27_3_255/_article/-char/ja,Nov. 14, 2021, 17 pages.
Achille et Soatto, "Information Dropout: Learning Optimal Representations Through Noise" Nov. 4, 2016, ICLR, arXiv: 1611.01353v1, pp. 1-12. (Year: 2016).
Hinton et al., "A Practical Guide to Training Restricted Boltzmann Machines," Springer, pp. 599-619, Jan. 1, 2012.
Hinton, Geoffrey E. . Training products of experts by minimizing contrastive divergence. Neural Computation, 14:1771-1800, 2002.
Hinton, Geoffrey, Simon Osindero, and Yee-Whye Teh. A fast learning algorithm for deep belief nets. Neural computation, 18(7):1527-1554, 2006.
International Search Report and Written Opinion of the International Searching Authority, dated Jan. 4, 2018, for International Application No. PCT/US2017/053303, 16 pages.
International Search Report and Written Opinion, dated Oct. 13, 2014, for international Application No. PCT/US2014/044421, 13 pages.
Jain et al., "Estimating the class prior and posterior from noisy positives and unlabeled data" Jun. 28, 2016, arXiv: 1606.08561v1, pp. 1-19. (Year: 2016).
Japanese Office Action for Application No. JP 2019516164, dated Nov. 24, 2021, 33 pages (including English translation).
Jordan, Michael I., Zoubin Ghahramani, Tommi S Jaakkola, and Lawrence K Saul. An introduction to variational methods for graphical models. Machine learning, 37(2):183-233, 1999.
Ke et al., "Variational Convolutional Networks for Human-Centric Annotations" Nov. 20, 2016, pp. 120-135. (Year: 2016).
Korean Office Action for Application 10-2019-7012141, dated Nov. 29, 2021, 18 pages (including English translation).
Korenkevych et al., "Benchmarking Quantum Hardware for Training of Fully Visible Boltzmann Machines" Nov. 14, 2016, arXiv: 1611.04528v1, pp. 1-22. (Year: 2016).
Le, Quoc , Marc'Aurelio Ranzato, Rajat Monga, Matthieu Devin, Greg Corrado, Kai Chen, Jeff Dean, and Andrew Ng. Building high-level features using large scale unsupervised learning. In ICML'2012, 2012.
LeCun, Y., L. Bottou, Y. Bengio, and P. Haffner. Gradient based learning applied to document recognition. Proc. IEEE, 1998.
Liu et Tao, "Classification with Noisy Labels by Importance Reweighting" Mar. 2016, pp. 447-461. (Year: 2016).

(56) References Cited

OTHER PUBLICATIONS

Long, Philip M and Rocco Servedio. Restricted boltzmann machines are hard to approximately evaluate or simulate. In Proceedings of the 27th International Conference on Machine Learning (ICML-10), pp. 703-710, 2010.
Menon et al., "Learning from Binary Labels with Instance-Dependent Corruption" May 4, 2016, pp. 1-41. (Year: 2016).
Miyata et al., "Consideration of 2D-FFT by Decomposition-of-Large Scale Data on Multi-GPU", IEICE Technical Report, vol. 114 No. 155, Computer Systems Jul. 28-30, 2014, Abstract, 12 pages.
Nalisnick, Eric, Lars Hertel, and Padhraic Smyth. "Approximate inference for deep latent gaussian mixtures." NIPS Workshop on Bayesian Deep Learning. vol. 2. 2016. (Year: 2016).
Niv, "Reinforcement Learning in the Brain". Journal of Mathematical Psychology, 2009—Elsevier.
Non-Final Office Action Issued in U.S. Appl. No. 15/753,661 dated Dec. 9, 2021, 15 pages.
Non-Final Office Action Issued in U.S. Appl. No. 15/822,884 dated Feb. 17, 2022, 45 pages.
Non-Final Office Action issued in U.S. Appl. No. 16/336,625 dated Feb. 14, 2022, 22 pages.
Non-Final Office Action Issued in U.S. Appl. No. 16/562,192 dated Apr. 4, 2022, 37 pages.
Omidshafiei et al., "Hierarchical Bayesian Noise Inference for Robust Real-time Probabilistic Object Classification" Jul. 14, 2016, arXiv: 1605.01042v2, pp. 1-9. (Year: 2016).
Ororbia et al., "Online Semi-Supervised Learning with Deep Hybrid Boltzmann Machines and Denoising Autoencoders" Jan. 18, 2016, ICLR, arXiv: 1511.06964v7, pp. 1-17. (Year: 2016).
Sakkaris, et al., "QuDot Nets: Quantum Computers and Bayesian Networks", arXiv:1607.0788/v1 [quant-ph] Jul. 26, 2016, 22 page.
Salimans, Tim, and David A. Knowles. "Fixed-form variational posterior approximation through stochastic linear regression." Bayesian Analysis 8.4 (2013): 837-882. (Year: 2013).
Salimans, Tim. "A structured variational auto-encoder for learning deep hierarchies of sparse features." arXiv preprint arXiv: 1602.08734 (2016). (Year: 2016).
Serban et al., "Multi-Modal Variational Encoder-Decoders" Dec. 1, 2016, arXiv: 1612.00377v1, pp. 1-18. (Year: 2016).
Shah et al., "Feeling the Bern: Adaptive Estimators for Bernoulli Probabilities of Pairwise Comparisons" Mar. 22, 2016, pp. 1-33. Year: 2016).
Somma, R., S Boixo, and H Barnum. Quantum simulated annealing. arXiv preprint arXiv:0712.1008, 2007.
Somma, RD, S Boixo, H Barnum, and E Knill. Quantum simulations of classical annealing processes. Physical review letters, 101(13):130504, 2008.
Suzuki, "Natural quantum reservoir computing for temporal information processing", Scientific Reports, Nature Portfolio, Jan. 25, 2022.
Tosh, Christopher, "Mixing Rates for the Alternating Gibbs Sampler over Restricted Boltzmann Machines and Friends" Jun. 2016.Year: 2016).
Tucci, "Use of a Quantum Computer to do Importance and Metropolis-Hastings Sampling of a Classical Bayesian Network", arXiv:0811.1792v1 [quant-ph] Nov. 12, 2008, 41 pages.
Van de Meent, J-W., Paige, B., & Wood, "Tempering by subsampling", 2014.
Wang et al., "Paired Restricted Boltzmann Machine for Linked Data" Oct. 2016. (Year: 2016).
Wang, W., Machta, J., & Katzgraber, H. G. "Population annealing: Theory and applications in spin glasses", 2015.
Xu et Ou "Joint Stochastic Approximation Learning of Helmholtz Machines" Mar. 20, 2016, ICLR arXiv: 1603.06170v1, pp. 1-8. (Year: 2016).
Yoshihara et al., "Estimating the Trend of Economic Indicators by Deep Learning", 2019-516164, Graduate School of System Informatics, Kobe University, 28 Annual Conferences of Japanese Society for Artificial Intelligence 2014, 10 pages.
Zhang et al., "Understanding Deep Learning Requires Re-Thinking Generalization", arXiv:1611.03530 Feb. 26, 2017. https://arxiv.org/abs/1611.03530.
Zhao et al., "Towards a Deeper Understanding of Variational Autoencoding Models", arXiv:1702.08658 Feb. 28, 2017. https://arxiv.org/abs/1702.08658.
Zojaji et al., "A Survey of Credit Card Fraud Detection Techniques: Data and Technique Oriented Perspective", arXiv:1611.06439 Nov. 19, 2016. https://arxiv.org/abs/1611.06439.
"On the Challenges of Physical Implementations of RBMs", arXiv: 1312.5258V1 [stat.ML] Dec. 18, 2013, XP-002743443, 9 pages.
Adachi, S.H. et al., "Application of Quantum Annealing to Training of Deep Neural Networks," URL:https://arxiv.org/ftp/arxiv/papers/151 0/1510.06356.pdf, Oct. 21, 2015, 18 pages.
Amin, "Effect of Local Minima on Adiabatic Quantum Optimization," Physical Review Letters 100(130503), 2008, 4 pages.
Hjelm, "Boundary-Seeking Generative Adversarial Networks", arXiv:1702.08431v4 [stat.ML], 17 pages, Feb. 21, 2018.
Zhu, X. et al., "Combining Active Learning and Semi-Supervised Learning Using Gaussian Fields and Harmonic Functions," ICML 2003 workshop on The Continuum from Labeled to Unlabeled Data in Machine Learning and Data Mining, 2003, 8 pages.
International Search Report and Written Opinion for PCT/US2019/017124, dated May 30, 2019, 28 pages.
International Search Report, dated May 10, 2017, for International Application No. PCT/US2017/015401, 3 pages.
International Search Report, dated Nov. 18, 2016, for International Application No. PCT/US2016/047627, 3 pages.
Jaakkola et al., "Improving the Mean Field Approximation Via the Use of Mixture Distributions," 1998, 11 pages.
Jenatton, R. et al., "Proximal Methods for Hierarchical Sparse Coding," arXiv:1009.2139v4 [stat.ML], Jul. 5, 2011, 38 pages.
Katzgraber et al., "Glassy Chimeras Could Be Blind to Quantum Speedup: Designing Better Benchmarks for Quantum Annealing Machines," Physical Review X(4):021008, 2014. (8 pages).
Khalek, S. et al., "Automated SQL Query Generation for Systematic Testing of Database Engines," ASE '10: Proceedings of the IEEE/ACM international conference on Automated software engineering, 2010, 4 pages.
Krähenbühl, P. et al., "Efficient Inference in Fully Connected CRFs with Gaussian Edge Potentials," arXiv:1210.5644 [cs.CV], 2012, 9 pages.
Kuželka, O. et al., "Fast Estimation of First-Order Clause Coverage through Randomization and Maximum Likelihood," ICML '08: Proceedings of the 25th international conference on Machine learning, 2008, 8 pages.
Lafferty, J. et al., "Conditional Random Fields: Probabilistic Models for Segmenting and Labeling Sequence Data," Proceedings of the 18th International Conference on Machine Learning 2001,10 pages.
Written Opinion of the International Searching Authority, dated Nov. 18, 2016, for International Application No. PCT/US2016/047627, 9 pages.
Minh, V. et al., "Learning to Label Aerial Images from Noisy Data," Proceedings of the 29th International Conference on Machine Learning, Edinburgh, Scotland, 2012, 8 pages.
Mirza et al., "Conditional Generative Adversarial Nets", arXiv:1411.1784v1 [cs.LG], 7 pages, Nov. 6, 2014.
Mocanu et al., "A topological insight into restricted Boltzmann machines," Pre-print version: arXiv:1604.05978v2: Jul. 2016. (25 pages).
Murray, I. et al., "Bayesian Learning in Undirected Graphical Models: Approximate MCMC Algorithms," UAI '04: Proceedings of the 20th conference on Uncertainty in Artificial Intelligence, 2004, 8 pages.
Natarajan, N. et al., "Learning with Noisy Labels," Advances in Neural Information Processing Systems 26, 2013, 9 pages.
Neven, H. et al., "QBoost: Large Scale Classifier Training with Adiabatic Quantum Optimization," JMLR: Workshop and Conference Proceedings 25, 2012, 16 pages.
Paninski, "Estimation of Entropy and Mutual Information," Neural Computation 15:1191-1253, 2003.

(56) References Cited

OTHER PUBLICATIONS

Prakash, "Quantum Algorithms for Linear Algebra and Machine Learning," Doctoral Thesis, Technical Report No. UCB/EECS-2014- 211, University of California at Berkeley, 2014, pp. 1-9.
Quattoni, A. et al., "Hidden Conditional Random Fields," IEEE Transactions on Pattern Analysis and Machine Intelligence, 29(10), 2007, 6 pages.
Reed et al., "Training Deep Neural Networks on Noisy Labels with Bootstrapping," arXiv:1412.6596v3 [cs.CV] Apr. 15, 2015, 11 pages.
Rezende et al., "Stochastic Backpropagation and Approximate Inference in Deep Generative Models," arXiv:1401.4082v3 [stat. ML] May 30, 2014, 14 pages.
Rolfe et al., "Discrete Variational Auto-Encoder Systems and Methods for Machine Learning Using Adiabatic Quantum Computers," U.S. Appl. No. 62/462,821, filed Feb. 23, 2017, 113 pages.
Rolfe et al., "Discrete Variational Auto-Encoder Systems and Methods for Machine Learning Using Adiabatic Quantum Computers," U.S. Appl. No. 62/404,591, filed Oct. 5, 2016, 87 pages.
Rolfe et al., "Systems and Methods for Machine Learning Using Adiabatic Quantum Computers," U.S. Appl. No. 62/207,057, filed Aug. 19, 2015, 39 pages.
Rolfe, "Discrete Variational Auto-Encoder Systems and Methods for Machine Learning Using Adiabatic Quantum Computers," U.S. Appl. No. 62/206,974, filed Aug. 19, 2015, 43 pages.
Rolfe, "Discrete Variational Auto-Encoder Systems and Methods for Machine Learning Using Adiabatic Quantum Computers," U.S. Appl. No. 62/268,321, filed Dec. 16, 2015, 52 pages.
Rolfe, "Discrete Variational Auto-Encoder Systems and Methods for Machine Learning Using Adiabatic Quantum Computers," U.S. Appl. No. 62/307,929, filed Mar. 14, 2016, 67 pages.
Rose et al., "First ever DBM trained using a quantum computer", Hack the Multiverse, Programming quantum computers for fun and profit, XP-002743440, Jan. 6, 2014, 8 pages.
Ross, S. et al., "Learning Message-Passing Inference Machines for Structured Prediction," CVPR 2011, 2011,8 pages.
Scarselli, F. et al., "The Graph Neural Network Model," IEEE Transactions on Neural Networks, vol. 20, No. 1,2009, 22 pages.
Spall, "Multivariate Stochastic Approximation Using a Simultaneous Perturbation Gradient Approximation," IEEE Transactions on Automatic Control 37(3):332-341, 1992.
Williams, "Simple Statistical Gradient-Following Algorithms for Connectionist Reinforcement Learning," College of Computer Science, Northeastern University, Boston, MA, 1992, 27 pages.
Sukhbaatar et al., "Training Convolutional Networks with Noisy Labels," arXiv:1406.2080v4 [cs.CV] Apr. 10, 2015, 11 pages.
Tieleman, T., "Training Restricted Boltzmann Machines using Approximation to the Likelihood Gradient," ICML '08: Proceedings of the 25th international conference on Machine learning, 2008, 8 pages.
Wang, Discovering phase transitions with unsupervised learning, Physical Review B 94, 195105 (2016), 5 pages.
Van der Maaten, L. et al., "Hidden-Unit Conditional Random Fields," Journal of Machine Learning Research 15, 2011, 10 Pages.
Venkatesh, et al., "Quantum Fluctuation Theorems and Power Measurements," New J. Phys., 17, 2015, pp. 1-19.
Rezende, Danilo J, et al., "Variational Inference with Normalizing Flows", Proceedings of the 32nd International Conference on Machine Learning, Lille, France 2015, JMLR: W&CP vol. 37, 9 pages.
Rolfe, "Discrete variational autoencoders" arXiv:1609.02200 Apr. 22, 2017. https://arxiv.org/abs/1609.02200.
Rose, et al., "Systems and Methods for Quantum Processing of Data, for Example Functional Magnetic Resonance Image Data". U.S. Appl. No. 61/841,129, filed Jun. 28, 2013, 129 pages.
Rose, et al., "Systems and Methods for Quantum Processing of Data, for Example Imaging Data". U.S. Appl. No. 61/873,303, filed Sep. 3, 2013, 38 pages.
Salakhutdinov, R., "Learning deep Boltzmann machines using adaptive MCMC", 2010.
Salakhutdinov, R., "Learning in Markov random transitions.elds using tempered", 2009.
Salakhutdinov, R. & Murray, I., "On the quantitative analysis of deep belief networks", 2008.
Saliman, Tim, "A Structured Variational Auto-encoder for Learning Deep Hierarchies of Sparse Features", arXiv:1602.08734v1 [stat. ML] Feb. 28, 2016, 3 pages.
Salimans, Tim, et al., "Markov Chain Monte Carlo and Variational Inference: Bridging the Gap", arXiv:1410.6460v4 [stat.CO] May 19, 2015, 9 pages.
Schulman, et al., "Gradient estimation using stochastic computing graphs". arXiv:1506.05254, Jan. 5, 2016. https://arxiv.org/abs/1506.05254.
Schwartz-Ziv, et al., "Opening the black box of Deep Neural Networks via Information", arXiv:1703,00810 Apr. 29, 2017. https://arxiv.org/abs/1703.00810.
Sethi, et al., "A revived survey of various credit card fraud detecion techniques", International Journal of Computer Science and Mobile Computing Apr. 14, 2014. https://tarjomefa.com/wp-content/uploads/2018/08/TarjomeFa-F994-English.pdf.
Shahriari, et al., "Taking the human out of the loop: A review of bayesian optimization", Proceedings of the IEEE 104 Jan. 1, 2016.
Silver, et al., "Mastering the game of Go with deep neural networks and tree search". Nature, 529. 484489, 2016.
Smelyanskiy, et al., "A near-term quantum computing approach for hard computational problems in space exploration" arXiv preprint arXir:1204.2821 (year:2012).
Sonderby, et al., "Ladder Variational Autoencoders", arXiv:1602.02282v3 [stat.ML] May 27, 2016, 12 pages.
Sprechmann, et al., "Dictionary learning and sparse coding for unsupervised clustering", in 2010 IEEE international conference on acoustics, speech and signal processing (pp. 2042-2045) IEEE (year:2010).
Sutton, "Learning to Predict by the Methods of Temporal Differences". https://webdocs.cs.ualberta.ca/ sutton/papers/sutton-88-with-erratum.pdf.
Sutton, R., et al., "Policy gradient methods for reinforcement learning with function approximation". Advances in Neural Information Processing Sytems, 12, pp. 1057-1063, MIT Press, 2000.
Suzuki, et al., "Joint Multimodal Learning With Deep Generative Models", Nov. 7, 2016, arXiv:1611.0189v1 (Year 2016).
Szegedy, et al., "Rethinking the Inception Architecture for Computer Vision", 2016, Proceedings of the IEEE Conference on Computer Vision and Pattern Recognition (CVPR), pp. 2818-2826 (Year: 2016).
Tieleman, T. & Hinton, G., "Using fast weights to improve persistent contrastive divergence", 2009.
Tokui, et al., "Evaluating the variance of likelihood-ratio gradient estimators", Proceedings of the 34th International Conference on Machine Learning, 2017. http://proceedings.mlr.press/v70/tokui17a.html.
Tripathi, et al., "Survey on credit card fraud detection methods", Internation Journal of Emerging Technology and Advanced Engineering Nov. 12, 2012.
Tucker, et al., "Rebar: Low-variance, unbiased gradient estimates for discrete latent variable models". arXiv:1703.07370, Nov. 6, 2017. https://aixiv.org/abs/1703.07370.
Vahdat, "Machine Learning Systems and Methods for Training with Noisy Labels," U.S. Appl. No. 62/427,020, filed Nov. 28, 2016, 30 pages.
Vahdat, "Machine Learning Systems and Methods for Training with Noisy Labels," U.S. Appl. No. 62/508,343, filed May 18, 2017, 46 pages.
Vahdat, "Toward Robustness against Label Noise in Training Deep Disciminative Neural Networks". arXiv:1706.00038v2, Nov. 3, 2017. https://arxiv.org/abs/1706.00038.
Vahdat, et al., "Dvae++: Discrete variational autoencoders with overlapping transformations", arXiv:1802.04920 May 25, 2018. https://arxiv.org/abs/1802.04920.
Van Det Maaten, et al., "Hidden unit conditional random Fields". 14th International Conference on Artificial Intelligence and Statistics, 2011.
Veit, et al., "Learning From Noisy Large-Scale Datasets With Minimal Supervision". arXiv:1701.01619v2, Apr. 10, 2017. https://arxiv.org/abs/1701.01619.

(56) References Cited

OTHER PUBLICATIONS

Wan, L., et al., "Regularization of Neural Networks using DropConnec". ICML 2013.
Wang, et al., "Classification of common human diseases derived from shared genetic and environmental determinants", Nature Genetics Aug. 7, 2017. https://www.nature.com/articles/ng.3931.
Welling, et al., "Bayesian learning via stochastic gradient langevin dynamics", ICML Jun. 28, 2011. https://dl.acm.org/doi/10.5555/3104482.3104568.
Wiebe, Nathan, et al., "Quantum Inspired Training for Boltzmann Machines", arXiv:1507.02642v1 [cs.LG] Jul. 9, 2015, 18 pages.
Williams, "Simple Statistical Gradient-Following Algorithms for Connectionist Reinforcement Learning," Springer, College of Computer Science, Northeastern University, Boston, MA, 1992, 27 pages. https://link.springer.com/article/10.1007/BF00992696.
Wittek, Peter, "What Can We Expect from Quantum Machine Learning". Yandex 1-32 School of Data Analysis Conference Machine Learning: Prospects and Applications, Oct. 5, 2015. pp. 1-16.
Xiao, et al., "Learning from massive noisy labeled data for image classification". The IEEE Conference on Computer Vision and Pattern Recognition (CVPR) 2015.
Xie, et al., "A Theory of Generative ConvNet". ICML 2016.
Xing, "Bayesian and Markov Networks: A unified view", Carnegie Mellon: School of Computer Science Sep. 19, 2007. http://www.cs.cmu.edu/~epxing/Class/10708-07/Slides/lecture3-BN&MRF.pdf.
Zhang, Yichuan, et al., "Continuous Relaxations for Discrete Hamiltonian Monte Carlo", School of Informatic, University of Edinburgh, Dept of Engineering, University of Cambridge, United Kingdom, 9 pages.
Zheng, et al., "Graph regularized sparse coding for image representation", IEEE transaction on image processing, 20(5), (Year: 2010) 1327-1336.
Husmeier, "Introduction to Learning Bayesian Networks from Data", Probabilistic Modeling in Bioinformatics and Medical Informatics 2005. https://link.springer.com/chapter/10.1007/1-84628-119-9_2.
Jang, et al., "Categorical reparameterization with Gumbel-Softmax", arXiv:1611.01144 Aug. 5, 2017. https://arxiv.org/abs/1611.01144.
Jiang, et al., "Learning a discriminative dictionary for sparse coding via label consistent K-SVD", in CVPR 2011 (pp. 1697-1704) IEEE. June,Year 2011).
Khalek, Shadi A, et al., "Automated SQL Query Generation for Systematic Testing of Database Engines", In proceedings of the IEEE/ACM International Conference of Automated Software Engineering pp. 329-332. Association of Computing Machinery. (Year: 2008).
Kingma, et al., "Adam: A method for stochastic optimization", arXiv:1412.6980 Jan. 30, 2017. https://arxiv.org/abs/1412.6980.
Kingma, et al., "Auto-encoding variational bayes". arXiv:1312.5258v1, May 1, 2014. https://arxiv.org/abs/1312.6114.
Kingma, Diederik P, et al., "Semi-Supervised Learning with Deep Generative Models", arXiv:1406.5298v2 [cs.LG], Oct. 31, 2014, 9 pages.
Raymond, et al., "Systems and Methods for Comparing Entropy and KL Divergence of Post-Processed Samplers," U.S. Appl. No. 62/322,116, filed Apr. 13, 2016, 47 pages.
Korenkevych, et al., "Benchmarking quantum hardware for training of fully visible boltzmann machines", arXiv:1611.04528 Nov. 14, 2016. https://arxiv.org/abs/1611.04528.
Krause, et al., "The Unreasonable Effectiveness of Noisy Data for Fine-Grained Recognition", 2016, Springer International Publishing AG, ECCV 2016, Part III, LNCS 9907, pp. 301-320 (Year:2016).
Kuzelka, Ondrej, et al., "Fast Estimation of First-Order Clause Coverage through Randomization and Maximum Likelihood", In proceeding of the 25th International Conference on Machine Learning (pp. 504-5112). Association for Computing Machinery (Year:2008).
L. Wan, M. Zieler, et. al., "Regularization of Neural Networks using DropConnect". ICML, 2013.
Le Roux, Nicolas, et al., "Representational Power of Restricted Boltzmann Machines and Deep Belief Networks", Dept. IRO, University of Montréal Canada, Technical Report 1294, Apr. 18, 2007, 14 pages.
Lee, et al., "Efficient sparse coding algorithm", NIPS, 2007,pp. 801-808.
Rezende, et al., "Stochastic Backpropagation and Approximate Inference in Deep Generative Models," arXiv:1401.4082v3 [stat.ML] May 30, 2014, 14 pages, https://arxiv.org/abs/1401.4082.
Lee, H., et al., "Sparse deep belief net model for visual area v2". Advances in Neural Information Processing Systems, 20. MIT Press, 2008.
Li, et al., "R/'enyi Divergence Variational Inference", arXiv:1602.02311 Oct. 28, 2016. https://arxiv.org/abs/1602.02311.
Lin, et al., "Efficient Piecewise Training of Deep Structured Models for Semantic Segmentation". arXiv:1504.01013v4, 2016.
Lovasz, et al., "A Correction: orthogonal representations and connectivity of graphs", Linear Algebra and it's Applications 313:2000 pp. 101-105.
Lovasz, et al., "Orthogonal Representations and Connectivity of Graphs", Linear Algebra and its applications 114/115: 1989, pp. 439-454.
Macready, et al., "Applications of Hardware Boltzmann Fits". U.S. Appl. No. 61/515,742, filed Aug. 5, 2011, 11 ages.
Macready, et al., "Applications of Hardware Boltzmann Fits". U.S. Appl. No. 61/540,208, filed Sep. 28, 2011, 12 pages.
Macready, et al., "Applications of Hardware Boltzmann Fits". U.S. Appl. No. 61/505,044, filed Jul. 6, 2011.
Macready, et al., "Systems and Methods for Minimizing an Objective Function". U.S. Appl. No. 61/550,275, filed Oct. 21, 2011, 26 pages.
Macready, et al., "Systems and Methods for Minimizing an Objective Function". U.S. Appl. No. 61/557,783, filed Nov. 9, 2011, 45 pages.
Maddison, et al., "The concrete distribution: A continuous relaxation of discrete random variables", arXiv:1611.00712 Mar. 5, 2017. https://arxiv.org/abs/1611.00712.
Makhzani, Alireza, et al., "Adversarial Autoencoders", arXiv:1511.05644v2 [cs.LG], May 25, 2016, 16 pages.
Mandt, et al., "A Variational Analysis of Stochastic Gradient Algorithms", arXiv:1602.02666 Feb. 8, 2016. https://arxiv.org/abs/1602.02666.
Misra, et al., "Seeing through the Human Reporting Bias: Visual Classifiers from Noisy Human-Centric Labels", 2016 IEEE Conference on Computer Vision and Pattern Recognition, IEEE, 2016, pp. 2930-2939.
Misra, et al., "Visual classifiers from noisy humancentric labels". In The IEEE Conference on Computer Vision and Pattern Recognition (CVPR), 2016.
Mnih, et al., "Neural variational inference and learning in belief networks". arXiv:1402.0030 Jun. 4, 2016. https://arxiv.org/abs/1402.0030.
Mnih, et al., "Variational inference for Monte Carlo objectives". arXiv:1602.06725, Jun. 1, 2016. https://arxiv.org/abs/1602.06725.
Mnih, Andriy, et al., "Variational Inference for Monte Carlo Objectives", Proceedings of the 33rd International Conference on Machine Learning, New York, NY USA, 2016, JMLR: W&CPp vol. 48, 9 pages.
Molchanov, Dmitry, et al., "Variational Dropout Sparsifies Deep Neural Networks", https://arxiv.org/pdf/1701.05369v1.pdf, Jan. 19, 2017.
Murphy, "A Brief Introduction to Graphical Models and Bayesian Networks", Oct. 14, 2001. https://www.cs.ubc.ca/~murphyk/Bayes/bayes_tutorial.pdf.
Murphy, "Machine Learning: a probalistic perspective", MIT Press, 2012. http://noiselab.ucsd.edu/ECE228/Murphy_Machine_Learning.pdf.
Muthukrishnan, et al., "Classical and quantum logic gates: an introduction to quantum computing", Quantum information seminar, )Year: 1999) 22 pages.
N. Srivastava, G. Hinton, et. al., "Dropout: A Simple Way to Prevent Neural Networks from Overtting". ICML 15 (Jun):19291958, 2014.

(56) References Cited

OTHER PUBLICATIONS

Neal, et al., "Mcmc Using Hamiltonian Dynamics", Handbook of Markov Chain Monte Carlo 2011.
Neven, et al., "Training a binary classifier with the quantum adiabatic algorithm", arXiv preprint arXivc:0811.0416, 2008, 11 pages.
Nowozin, Sebastian, et al., "f-GAN: Training Generative Neural Samplers using Variational Divergence Minimization", arXiv:1606.00709v1 [stat.ML], 17 pages., Jun. 2, 2016.
Olshausen, Bruno A, et al., "Emergence of simple cell receptive field properties by learning a sparse code for natural images", NATURE, vol. 381, Jun. 13, 1996, pp. 607-609.
Patrini, et al., Making Neural Networks robust to label noise: a loss correction approach. arXiv: 1609.03683 (2016).
Phua, et al., "A comprehensive survey", arXiv:1009.6119 Aug. 30, 2010. https://arxiv.org/abs/1009.6119.
Pozzolo, et al., "Learned Lessons in credit card fraud detection from a practitioner perspective", Feb. 18, 2014. https://www.semanticscholar.org/paper/Learned-lessons-in-credit-card-fraud-detection-from-Pozzolo-Caelen/6d2e2a1caf5b3757ed0e8f404eabb31546d5698a.
Rasmus, Antti, et al., "Semi-Supervised Learning with Ladder Networks", arXiv:1507.02672v2 [cs.NE] Nov. 24, 2015, 19 pages.
International Search Report and Written Opinion for PCT/US2018/065286, dated Apr. 16, 2019, 11 pages.
Li, X., et al., "Collaborative Variational Autoencoder for Recommender Systems," Published in KDD, Halifax, NS, Canada, Aug. 13-17, 2017, pp. 305-314.
Strub, F., et al. "Hybrid Collaborative Filtering with Autoencoders," arXiv:1603.00806v3 [cs.IR], Jul. 19, 2016, 10 pages.
Van Baalen, M. "Deep Matrix Factorization for Recommendation," Master's Thesis, Univ.of Amsterdam, Sep. 30, 2016, URL: https://scholar.google.co.kr/scholar?q=Deep+Matrix+Factorization+for+Recommendation&hl=ko&as_sdt=O&as_vis=I&oi-scholar, 99 pages.
Amin, et al., "Quatum Boltzmann Machine". arXiv:1601.02036v1, Jan. 8, 2016.
Anonymous, "A Robust Learning Approach to Domain Adaptive Object Detection". CVPR, 2019.
Azadi, et al., "Auxiliary Image Regulation for Deep CNNs with Noisy Labels". arXiv:1511.07069v2 (2016).
B. Sallans and G.E. Hitton, "Reinforcement Learning with Factored States and Actions". JMLR, 5:1063-1088, 2004.
Bach, et al., "Optimization with Sparsity-Inducing Penalties". arXiv:1108.0775v2, Nov. 22, 2011.
Bahnsen, et al., "Feature Engineering Strategies for Credit Card Fraud Detection", Expert systems with applications Elsevier Jun. 1, 2016. https://www.sciencedirect.com/science/article/abs/pii/S0957417415008386?via%3Dihub.
Barron-Romero, Carlos, "Classical and Quantum Algorithms for the Boolean Satisfiability Problem", CoRR, Abs/1510.02682)Year:2015).
Bearman, et al., "What's the Point: Semantic Segmentation with Point Supervision". ECCV, Jul. 23, 2016. https://arxiv.org/abs/1506.02106.
Bell, et al., "The "Independent Components" of Natural Scenes are Edge Filters", Vision Res. 37(23) 1997,:pp. 3327-3338.
Bellman, R. E., "Dynamic Programming". Princeton University Press, Princeton, NJ. Republished 2003: Dover, ISBN 0-486-42809-5.
Bhattacharyya, et al., "Data mining for credit card fraud: A comparitive study", Decision Support Systems 2011. https://www.semanticscholar.org/paper/Data-mining-for-credit-card-fraud%3A-A-comparative-Bhattacharyya-Jha/9d26f0ba02ee5efe9b9c7bdcb5f528c8b8253cf7.
Bian, et al., "The Ising Model: teaching an old problem new tricks", D-wave systems. 2 (year 2010), 32 pages.
Bielza, et al., "Bayesian networks in neuroscience: a survey", Oct. 16, 2014, Frontiers in Computational Neuroscience, vol. 8, Article 131, p. 1-23 (Year: 2014).
Bolton, et al., "Statistical fraud detection: A review", Statistical Science 17(3) Aug. 1, 2002. https://projecteuclid.org/journals/statistical-science/volume-17/issue-3/Statistical-Fraud-Detection-A-Review/10.1214/ss/1042727940.full.
Burda, et al., "Importance Weighted Autoencoders", arXiv:1509.00519 Nov. 7, 2016. https://arxiv.org/abs/1509.00519.
Buss, "Introduction to Inverse Kinematics with Jacobian Transpose, Pseudoinverse and Damped Least Squares methods", Mathematics UCS 2004. https://www.math.ucsd.edu/~sbuss/ResearchWeb/ikmethods/iksurvey.pdf.
Chen, et al., "Domain Adaptive Faster R-CNN for Object Detection in the Wild". IEEE Xplore, 2018. https://arxiv.org/abs/1803.03243.
Chen, et al., "Stochastic Gradient Hamiltonian Monte Carlo", arXiv:1402.4102 May 12, 2014. https://arxiv.org/abs/1402.4102.
Cho, Kyunghyun, et al., "On the Properties of Neural Machine Translation: Encoder-Decoder Approaches", arXiv:1409.1259v2, [cs.CL] Oct. 7, 2014, 9 pages.
Cho, K-H., Raiko, T, & Ilin, A., "Parallel tempering is efficient for learning restricted Boltzmann machines", 2010.
Courbariaux, M., et al., "Binarized Neural Networks: Training Neural Networks with Weights and Activations Constrained to +1 or −1". http://arxiv.org/pdf/1602.02830.pdf.
Dai, et al., "Generative Modeling of Convolutional Neural Networks". ICLR 2015.
Doersch, "Tutorial on variational autoencoders", arXiv:1606.05908 Jan. 3, 2021. https://arxiv.org/abs/1606.05908.
Dumoulin, et al., "On the Challenges of Physical Implementations of RBMs", https://arxiv.org/abs/1312.5258v2, Oct. 28, 2014.
Fabius, Otto, et al., "Variational Recurrent Auto-Encoders", Accepted as workshop contributions at ICLR 2015, 5 pages.
Fischer, A. & Igel, C., "A bound for the convergence rate of parallel tempering for sampling restricted Boltzmann machines", 2015.
Friedman, et al., "Learning Bayesan Networks from Data", Stanford Robotics. http://robotics.stanford.edu/people/nir/tutorial/index.html.
G. Hinton, N. Srivastava, et. al, "Improving neural networks by preventing co-adaptation of feature detectors". CoRR, abs/1207.0580, 2012.
G.A. Rummery and M. Niranjan, "Online Q-Learning using Connectionist Systems". CUED/FINFENG/TR 166, Cambridge, UK, 1994.
Gal, et al., "Bayesian Convolutional Neural Networks with Bernoulli Approximate Variational Inference". arXiv:1506.02158v6, 2016.
Glynn, "Likelihood ratio gradient estimation for stochastic systems". Communications of the ACM, 1990. https://dl.acm.org/doi/10.1145/84537.84552.
Gomez-Bombarelli, et al., "Automatic chemical designs using a data-driven continuous representation of molecules", arXiv:1610.02415 Dec. 5, 2017. https://arxiv.org/abs/1610.02415.
Grathwohl, et al., "Backpropagation through the void: Optimizing control variates for black-box gradient etimation". arXiv:1711.00123, Feb. 23, 2018. https://arxiv.org/abs/1711.00123.
Gregor, et al., "Deep autoregressive networks". arXiv:1310.8499, May 20, 2014. https://arxiv.org/abs/1310.8499.
Gregor, Karol, et al., "Draw: A Recurrent Neural Network For Image Generation", Proceedings of the 32nd International Conference on Machine Leaning, Lille, France, 2015, JMLR: W&CP vol. 37. Copyright 2015, 10 pages.
Gu, et al., "Muprop: Unbiased backpropagation for stochastic neural networks". arXiv:1511.05176, Feb. 25, 2016. https://arxiv.org/abs/1511.05176.
Hamze, "Sampling from a Set Spins with Clamping". U.S. Appl. No. 61/912,385, filed Dec. 5, 2013, 35 pages.
Hees, "Setting up a Linked Data mirror from RDF dumps". Jörn's Blog, Aug. 26, 2015. SciPy Hierarchical Clustering and Dendrogram Tutorial | Jörn's Blog (joernhees.de).
Heess, N., et al., "Actor-Critic Reinforcement Learning with Energy-based Policies". JMLR, 24:43-57, 2012.
Heidrich-Meisner, et al., "Reinforcement Learning in a Nutshell". http://image.diku.dk/igel/paper/RLiaN.pdf.

(56) References Cited

OTHER PUBLICATIONS

Hidasi, et al., "Session-based recommendations with recurrent neural networks", ICRL Mar. 29, 2016. https://arxiv.org/abs/1511.06939.
Hinton, Geoffrey , "A Practical Guide to Training Restricted Boltzmann Machines", Version 1, Department of Computer Science University of Toronto, Aug. 2, 2010, 21 pages.
Hurley, Barry , et al., "Proteus: A hierarchical Portfolio of Solvers and Transformations", arXiv:1306.5606v2 [cs.AI], Feb. 17, 2014, 17 pages.
Hinton, Geoffrey E, et al., "Autoencoders, Minimum Description Length and Helmholtz Free Energy", Department of Computer Science, University of Toronto, Computation Neuroscience Laboratory, The Salk Institute, Mar. 1, 2001, 9 pages.
Hinton, Geoffrey E, et al., "Reducing the Dimensionality of Data with Neural Networks", Science, wwwsciencemag.org, vol. 313, Jul. 28, 2006, pp. 504-507.
Humphrys, M. , http://computing.dcu.ie/ humphrys/PhD/ch2.html.
Blume-Kohout, et al., "Streaming Universal Distortion-Free Entanglement Concentration"; IEEE Transactions on Information Theory Year: 2014; vol. 60, Issue 1; Journal Article' Publisher: IEEE; 17 pages.
Chen, et al., "Variational Lossy Autoencoder" Nov. 8, 2016, arXiv: 1611.02731v1, pp. 1-13. (Year: 2016).
Covington, et al., "Deep Neural Networks for YouTube Recommendations", RecSys '16, Sep. 15-19, 2016, Boston MA,8 pages.
Dziugaite, et al., "Neural Network Matrix Factorization", arXiv:1511.06443v2 [CS.LG| Dec. 15, 2015, 7 pages,.
Kingma et ai., "Improving Variational Inference with Inverse Autoregressive Flow" Jun. 15, 2016, arXiv:1606.04934v1, pp. 1-10. (Year: 2016).
Marlin, et al., "Collaborative Prediction and Ranking with Non-Random Missing Data", RecSys'09, Oct. 23-25, 2009, New York, New York, USA., 8 pages.
Non Final Office Action for U.S. Appl. No. 16/270,273, dated Jun. 27, 2022, 13 pages.
Non Final Office Action for U.S. Appl. No. 16/779,035, dated Aug. 8, 2022, 8 pages.
Non-Final Office Action issued in U.S. Appl. No. 16/779,035, dated Aug. 17, 2022, 16 pages.
Notice of Allowance for U.S. Appl. No. 15/822,884, dated Aug. 8, 2022, 13 pages.
Notice of Allowance for U.S, U.S. Appl. No. 16/682,976, dated May 27, 2022, 11 pages.
Notice of Allowance for U.S. Appl. No. 16/714,103, dated Jun. 3, 2022, 9 pages.
Oord, et al., "Pixel Recurrent Neural Networks", 33rd International Conference on Machine Learning, New York, NY, USA, 2016. JMLR: W&CP vol. 48, 10 pages. 48.
Rolfe, Jason Tyler "Discrete Variational Autoencoders" Sep. 7, 2016, arXiv: 1609.02200v1 , pp. 1-29. (Year: 2016).
Salakhutdinov, et al., "Restricted Boltzmann Machines for Collaborative Filtering", International Conference on Machine Learning, Corvallis, OR, 2007, 8 pages.
Sedhain, et al.,"AutoRec: Autoencoders Meet Collaborative Filtering", WWW 2015 Companion, May 18-22, 2015, Florence, Italy, 2 pages.
van Rooyen, et al., "Learning with Symmetric Label Noise: The Importance of Being Unhinged" May 28, 2015, arXiv: 1505.07634v1, pp. 1-30. (Year: 2016).

* cited by examiner

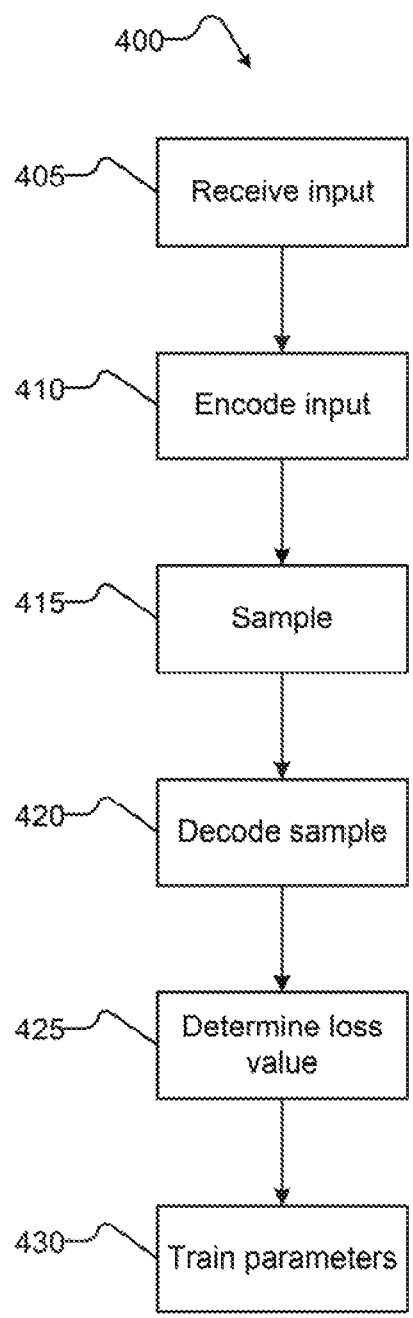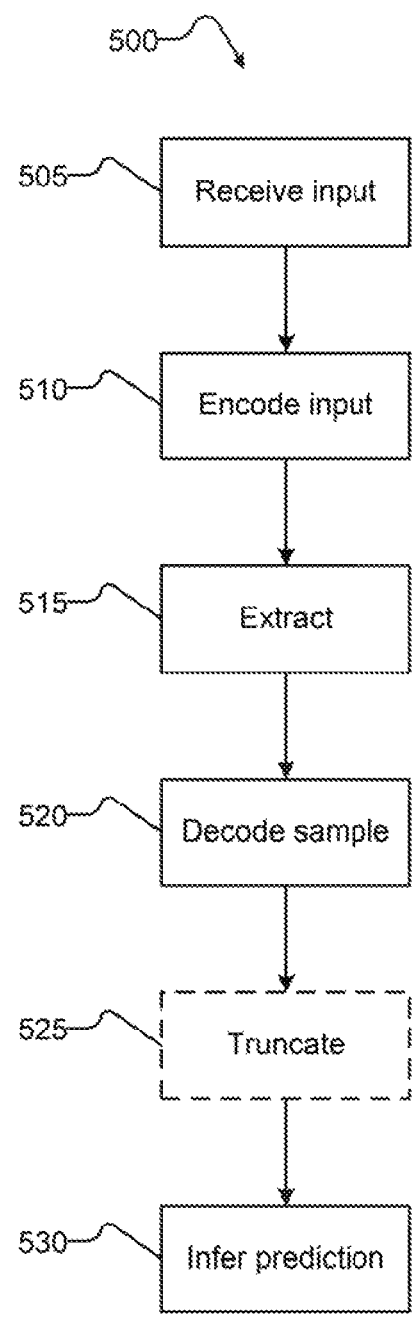
FIG. 4
FIG. 5

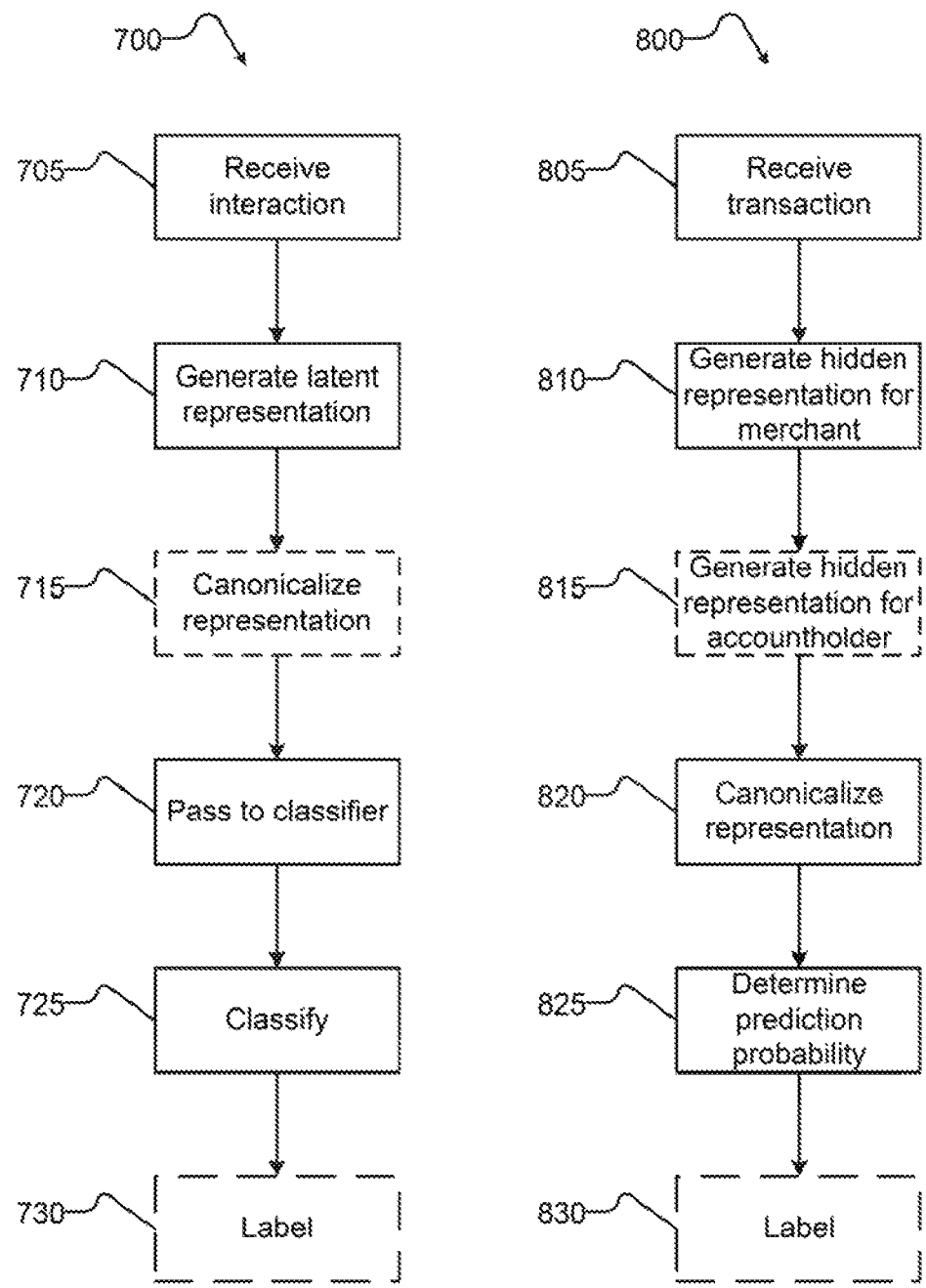

SYSTEMS AND METHODS FOR COLLABORATIVE FILTERING WITH VARIATIONAL AUTOENCODERS

FIELD

This disclosure generally relates to machine learning, and in particular to collaborative filtering.

BACKGROUND

Collaborative filtering is a family of techniques most commonly used to predict user preferences (or "ratings") for one or more items based on a corpus of known ratings. For instance, given the ratings assigned by a user to a subset of items, a collaborative filtering technique may attempt to infer a distribution over ratings for one or more items that have not been rated by that user based on the known ratings of that user and of other, similar users. Collaborative filtering finds applications in recommendation systems, such as those used by popular online shopping, video, dating, advertisement, and other services.

Collaborative filtering is often performed via matrix factorization techniques. For instance, the set of ratings (by users of items) may be represented as a matrix $R_{ij}$, where the $i^{th}$ row corresponds to a particular user and the $j^{th}$ column corresponds to a particular item (so that the $(i,j)^{th}$ element corresponds to the $i^{th}$ user's rating of the $j^{th}$ item). Such techniques may define an m×d user matrix U and a d×n item matrix V, where m is the number of users, n is the number of items, and d is the dimensionality of the latent space. The item and user vectors U and V are trained to minimize a difference between the known ratings $R_{ij}$ and the product $U_i \cdot V_j$ (where $U_i$ is the $i^{th}$ row of U, correspond to a user's latent distribution, and $V_j$ is the $j^{th}$ column of V, corresponding to an item's latent distribution). The product U·V thus provides a predicted rating for each user-item pair. Such techniques can encounter obstacles, however, when relationships between elements are complex (e.g., non-linear), which may require a high-dimensional latent space for accurate representation. That high-dimensionality can impede efficient training and may lead to overfitting, whereas a lower-dimensionality may suffer from poor accuracy.

More recently, neural-network-based approaches have been applied to collaborative filtering problems. These include neural autoregressive distribution estimators (NADEs) and variational autoencoders (VAEs). Van Baalen, in Deep Matrix Factorization for Recommendation, 2016, describes a VAE-based system which requires that two VAEs be jointly trained over complete subgraphs of the input data (i.e., over substantially all known ratings, in most circumstances), since each VAE requires the output of the other VAE to perform its training.

There remains a general desire for systems and methods for providing collaborative filtering systems which are trainable efficiently and/or accurately over a diverse range of inputs, such as complex and/or large input datasets.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to be able to process at least some problems having size and/or connectivity greater than (and/ or at least not fully provided by) the working graph of an analog processor. Computational systems and methods are described which, at least in some implementations, allow for the computation of at least some problem graphs which have representations which do not fit within the working graph of an analog processor (e.g., because they require more computation devices and/or more/other couplers than the processor provides).

Aspects of the presently-disclosed systems and methods include systems and methods for training a collaborative filtering system over an input space comprising values. Each value is associated with a row dimension and a column dimension. Systems include at least one processor and at least one nontransitory processor-readable storage medium. The storage medium stores at least one of processor-executable instructions or data which, when executed by the at least one processor cause the at least one processor to perform one of the presently-disclosed methods.

Some aspects of the methods include receiving an input row vector comprising one or more observed values associated with a first row element in the row dimension; encoding, by a row-wise encoder of a variational autoencoder, the input row vector to an encoded row vector; decoding, by a decoder of a variational autoencoder, a first model distribution over the input space for a first row-column pair based on the encoded row vector and a learned column vector of a set of learned column vectors, the learned column vector being a parameter of the encoder and comprising one or more learned values associated with a first column element of the first row-column pair; determining a first loss value based on a first subset of observed values in the input space and the first model distribution; and training one or more parameters of the variational autoencoder based on the first loss value, the training comprising training at least a subset of the learned column vectors based on the first loss value.

In some implementations, training one or more parameters of the variational autoencoder comprises training the one or more parameters based on a plurality of minibatches. In some implementations, the plurality of minibatches comprises first and second disjoint minibatches, the first minibatch comprising a first input row vector and the second minibatch comprising a second input row vector, the first and second input row vectors each comprising observed input values for a shared element in the column dimension.

In some implementations, the method comprises receiving an input column vector comprising one or more observed values associated with a second column element in the column dimension; encoding, by a column-wise encoder of a variational autoencoder, the input column vector to an encoded column vector; decoding, by a decoder of a variational autoencoder, a second model distribution over the input space for a second row-column pair based on the encoded column vector and a learned row vector of a set of learned row vectors, the learned row vector being a parameter of the column-wise encoder and comprising one or more learned values associated with a row element of the second row-column pair; determining a second loss value based on a second subset of observed values in the input space and the second model distribution; and training one or more parameters of the variational autoencoder based on the second loss value, the training comprising training at least a subset of the learned row vectors based on the second loss value.

In some implementations, the method further comprises assisting the training of the subset of the learned column vectors based on an output of the column-wise encoder. In some implementations, assisting the training of the subset of the learned column vectors comprises determining the first loss value based on a regularization term, the regularization term binding the subset of the learned column vectors to the output of the column-wise encoder. In some implementations, the regularization term comprises an L2 regularization term between the learned column vectors and the output of the column-wise encoder. In some implementations, assisting the training of the subset of the learned column vectors comprises performing gradient descent optimization over the subset of the learned column vectors. In some implementations, training the one or more parameters of the variational autoencoder comprises using a first training technique for the learned column vectors and a second training technique for at least one other parameter of the variational autoencoder, the second training technique based on a measurement of a gradient over time.

In some implementations, training one or more parameters of the variational autoencoder comprises alternately training the row-wise encoder and the column-wise encoder, the row-wise encoder trained based on one or more row-wise minibatches and the column-wise encoder trained based on one or more column-wise minibatches, the row-wise minibatches comprising row input vectors and the column-wise minibatches comprising column-wise input vectors.

In some implementations, the decoder is shared by the row-wise and column-wise encoders and training one or more parameters of the variational autoencoder comprises training one or more parameters of the decoder based on the first and second loss values.

In some implementations, encoding the input row vector to the encoded row vector comprises determining a latent distribution in a latent space of the row-wise encoder based on the input row vector; sampling from the latent space based on the latent distribution, thereby obtaining a sample associated with the first row element. In some implementations, encoding the input row vector to the encoded row vector further comprises transforming the sample into the encoded row vector.

In some implementations, decoding the first model distribution comprises merging the encoded row vector and learned column vector into a merged vector; and transforming the merged vector into the first model distribution based on a prior distribution of the decoder. In some implementations, merging the encoded row vector and learned column vector comprises performing a linear transformation of the encoded row vector and learned column vector. In some implementations, transforming the merged vector into the first model distribution comprises providing the merged vector to a neural network as input and receiving the first model distribution as output.

In some implementations, the latent space comprises a restricted Boltzmann machine. In some implementations, sampling from the latent space comprises representing the restricted Boltzmann machine in a topological quantum processor, executing the quantum processor to determine a sample output, and obtaining the sample based on the sample output.

In some implementations, each element of the row dimension corresponds to a user, each element of the column dimension corresponds to an item ratable by the user, and each value of the input space corresponds to a rating for a user-item pair.

Some aspects of the methods include receiving an input row vector of values in the input space, the input row vector comprising one or more observed values associated with a first row element in the row dimension; encoding, by a row-wise encoder of a variational autoencoder, the input row vector to an encoded row vector; decoding, by a decoder of a variational autoencoder, a first model distribution over the input space for a first row-column pair based on the encoded row vector and a learned column vector of a set of learned column vectors, the learned column vector being a parameter of the encoder and comprising one or more learned values associated with a first column element of the first row-column pair; and determining a predicted value based on the first model distribution.

In some implementations, the first model distribution is a joint probability distribution modelling, for the row-column pair, at least: one or more probabilities associated with one or more values in the input space; and a probability that the first row-column pair does not have an observed value. In some implementations, the input row vector represents values categorically and at least one category corresponds to there being no observed value. In some implementations, the first row element corresponds to a user, the column element corresponds to an item, values correspond to ratings by users of items, and the probability that the first row-column pair does not have an observed value corresponds to a probability that the row-column pair is not rated.

In some implementations, determining a predicted value comprises determining a truncated value based on the first model distribution conditioned on the associated row-column pair having an observed value. In some implementations, wherein determining a predicted value further comprises normalizing the truncated value to yield a normalized value and determining the predicted value based on an expectation value of the normalized value.

In some implementations, the first model distribution comprises a probability distribution over a characteristic of the first row-column pair and determining a predicted value further comprises determining a probability that the first row-column pair has the characteristic. In some implementations, the first row element corresponds to a user, the column element corresponds to an item, values correspond to ratings by users of items, and the characteristic corresponds to an interaction between the user and the item, the interaction not associated with a rating.

In some implementations, encoding the input row vector to the encoded row vector comprises determining a latent distribution of the first row element in a latent space of the row-wise encoder; and deterministically extracting an extracted value from the latent space based on the latent distribution, the extracted value associated with the first row element. In some implementations, it further comprises transforming the extracted value into the encoded row vector. In some implementations, deterministically extracting the extracted value comprises determining a mean of the latent space for the first row element.

Aspects of the present disclosure provide systems and methods for searching for a target column in an input space comprising values, each value associated with a row dimension and a column dimension. The method is executed by circuitry including at least one processor and comprises receiving an identification of an input row in the row dimension; generating a first proposal set comprising one or more columns based on, for each of the columns of the first proposal set, a representation of the column generated by a collaborative filtering model trained over the input space; receiving a first response set comprising one or more values, each value of the first response set being associated with a corresponding column of the first proposal set; and generating a second proposal set comprising one or more columns based on, for each of the columns of the second proposal set, a representation of the column generated by the collaborative filtering model and the first response set.

In some implementations, for at least one column of the first proposal set or the second proposal set, the representation of the column generated by the collaborative filtering model comprises at least one of: a latent representation from a latent space of the collaborative filtering model and a learned column vector of the collaborative filtering model.

In some implementations, generating the first proposal set comprises selecting the one or more columns of the first proposal set based on a diversity metric, the diversity metric comprising a measure of distance between points in the latent space of the collaborative filtering model.

In some implementations, generating the second proposal set comprises selecting the one or more columns of the second proposal set based on a predicted value for each column of the second proposal set, the predicted value based on a prediction of the collaborative filtering model corresponding to the column. In some implementations, generating the second proposal set comprises selecting the one or more columns of the second proposal set based on a weighted combination of the predicted value for each column of the second proposal set and the diversity metric.

In some implementations, the method comprises iteratively generating one or more further proposal sets, each further proposal set comprising one or more columns based on a corresponding further response set.

In some implementations, generating one or more further proposal sets comprises annealing one or more weights of the weighted combination based on a number of iterations completed.

In some implementations, columns of the input space correspond to items, rows of the input space correspond to users, values of the input space correspond to ratings by users of items, and receiving a first response set comprises receiving one or more ratings of items by a user correspond to the input row, each of the one or more rating corresponding to a column of the first proposal set. In some implementations, the values of the input space comprise categorical values with three or more potential values. In some implementations, the values of the input space comprise continuous values.

In some implementations, generating a second proposal set comprises generating an updated representation for at least one of the columns of the second proposal set via the collaborative filtering model based on the first response set.

In some implementations, the method comprises training the collaborative filtering model based on the first response set.

In some implementations, the method comprises searching for a second target column for a second identified row based on the collaborative filtering model trained on the first response set.

Aspects of the present disclosure provide systems and methods for detecting anomalies. The method is executed by circuitry including at least one processor and comprises: receiving an indication of an interaction between a first entity and a second entity, the first entity represented as a row in an input space of a collaborative filtering model and the second entity represented as a column in the input space, the input space comprising values at row-column intersections; generating a latent representation for at least one of the first and second entities with the collaborative filtering model, wherein generating a latent representation comprises encoding the at least one of the first and second entities with an encoder of a variational autoencoder, the encoder mapping at least one of rows and columns to a latent space of the variational autoencoder; and generating, by a classifier model defined over the latent space of the variational autoencoder, a classification comprising one or more of: an anomalous classification and a non-anomalous classification based on the latent representation.

In some implementations, the method comprises canonicalizing the latent representation into a deterministic representation, canonicalizing comprising transforming an approximating posterior distribution generated by the encoder to one or more scalar values.

In some implementations, transforming an approximating posterior distribution comprises determining a mean of the approximating posterior distribution.

In some implementations, the method comprises labelling the interaction as anomalous based on a probability generated by the classifier and associated with the anomalous classification.

In some implementations, the first entity corresponds to a cardholder in a payment network, the second entity corresponds to a merchant in the payment network, and the interaction comprises a transaction between the cardholder and the merchant.

In some implementations, generating the classification comprises generating, by the classifier model, the classification based on an amount of the transaction and the method comprising providing the amount of the transaction as an input to the classifier independent of the latent representation generated by the encoder.

Aspects of the present disclosure provide systems and methods for detecting fraudulent transactions on a payment network. The method is executed by circuitry including at least one processor and comprises: receiving transaction information relating to a transaction between an accountholder and a merchant, the accountholder represented as a row in an input space of a collaborative filtering model and the merchant represented as a column in the input space, the input space comprising values at row-column intersections; generating a first hidden representation for the merchant with the collaborative filtering model; generating a second hidden representation for the accountholder with the collaborative filtering model; generating a predicted value based on a prediction by the collaborative filtering model that the transaction would occur based on the first and second hidden representations; and generating a label for the transaction based on the predicted value.

In some implementations, the method comprises canonicalizing the hidden representation into a deterministic representation.

In some implementations, the collaborative filtering model comprises a variational autoencoder and canonicalizing comprises transforming an approximating posterior distribution generated by an encoder of the variational autoencoder to one or more scalar values.

In some implementations, transforming an approximating posterior distribution comprises determining a mean of the approximating posterior distribution.

In some implementations, generating the label comprises generating a prediction of the collaborative filtering model that the transaction is fraudulent and generating the label based on a probability associated with the prediction.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale.

For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 4 is a flowchart of an example method for training the example collaborative filtering system of any of FIGS. 2A, 2B and 3.

FIG. 5 is a flowchart of an example method for performing inference with the example collaborative filtering system of any of FIGS. 2A, 2B and 3.

FIG. 7 is a flowchart of an example method for detecting anomalies using a collaborative filtering VAE/classifier hybrid model.

FIG. 8 is a flowchart of an example method for detecting fraudulent transactions on a payment network using a collaborative filtering model.

DETAILED DESCRIPTION

Figure 1:
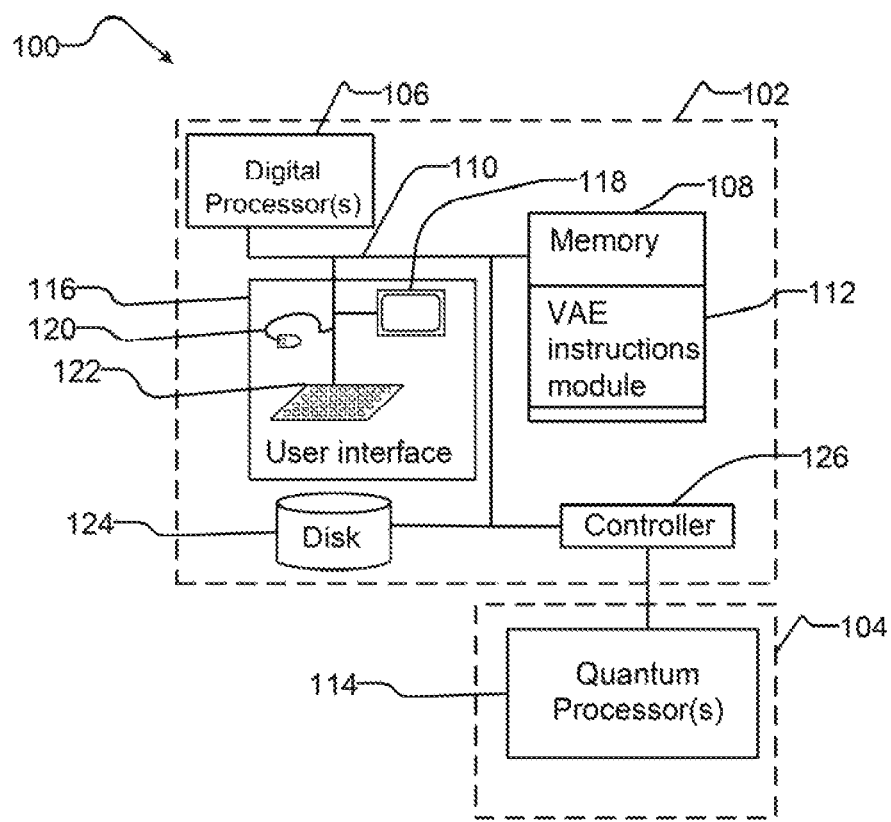
FIG. 1 is a schematic diagram of an example computing system including a digital computer and, optionally, an analog computer according to the present disclosure.

The present disclosure relates to machine learning. In some implementations, collaborative filtering system based on a variational autoencoder (VAE) is provided. The VAE may be trained on row-wise data without necessarily training a paired VAE on column-wise data (or vice-versa), and may optionally be trained via minibatches. The row-wise VAE models the output of the corresponding column-based VAE as a set of parameters and uses these parameters in decoding. In some implementations, a paired VAE is provided which receives column-wise data and models row-wise parameters; each of the paired VAEs may bind their learned column- or row-wise parameters to the output of the corresponding VAE. The paired VAEs may optionally be trained via minibatches. Unobserved data may be explicitly modelled. Methods for performing inference with such VAE-based collaborative filtering systems are also disclosed.

Introductory Generalities

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The terms "user", "item", and "rating" are used throughout this specification for convenience, as these terms are widely used in the art. Unless the context clearly dictates otherwise, such references refer generally to arbitrary dimensions in an input space (in the case of "user" and "item") and to values lying in the input space (in the case of "rating"). Similarly, the terms "row", "column", and "vector" are used in the specification and claims to refer more generally to the dimensions of the input space, but these terms (as used herein) do not imply any specific directionality or data structure. For example, the use of "row" and "column" does not require or suggest that data is stored as a formal matrix in memory, and the use of "vector" does not require that a vector's constituent elements be stored contiguously in memory. To aid the reader, this specification will generally assume, without loss of generality, that users are elements along the row dimension and items are elements along the column dimension.

The headings and Abstract of the Disclosure provided herein are for convenience only and do not interpret the scope or meaning of the implementations.

Computing Systems

FIG. 1 illustrates a computing system 100 comprising a digital computer 102. The example digital computer 102 includes one or more digital processors 106 that may be used to perform classical digital processing tasks. Digital computer 102 may further include at least one system memory 108, and at least one system bus 110 that couples various system components, including system memory 108 to digital processor(s) 106. System memory 108 may store a VAE instructions module 112.

The digital processor(s) 106 may be any logic processing unit or circuitry (e.g., integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 100 comprises an analog computer 104, which may include one or more quantum processors 114. Digital computer 102 may communicate with analog computer 104 via, for instance, a controller 126. Certain computations may be performed by analog computer 104 at the instruction of digital computer 102, as described in greater detail herein.

Digital computer 102 may include a user input/output subsystem 116. In some implementations, the user input/output subsystem includes one or more user input/output components such as a display 118, mouse 120, and/or keyboard 122.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer- or processor-readable storage media or non-volatile memory 124. Non-volatile memory 124 may take a variety of forms, including: a hard disk drive for reading from and writing to a hard disk (e.g., magnetic disk), an optical disk drive for reading from and writing to removable optical disks, and/or a solid state drive (SSD) for reading from and writing to solid state media (e.g., NAND-based Flash memory). The optical disk can be a CD-ROM or DVD, while the magnetic disk can be a rigid spinning magnetic disk or a magnetic floppy disk or diskette. Non-volatile memory 124 may communicate with digital processor(s) via system bus 110 and may include appropriate interfaces or controllers 126 coupled to system bus 110. Non-volatile memory 124 may serve as long-term storage for processor- or computer-readable instructions, data structures, or other data (sometimes called program modules) for digital computer 102.

Although digital computer 102 has been described as employing hard disks, optical disks and/or solid state storage media, those skilled in the relevant art will appreciate that other types of nontransitory and non-volatile computer-readable media may be employed, such magnetic cassettes, flash memory cards, Flash, ROMs, smart cards, etc. Those skilled in the relevant art will appreciate that some computer architectures employ nontransitory volatile memory and nontransitory non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104. Also for example, system memory 108 may store at least one of processor executable instructions or data that, when executed by at least one processor, causes the at least one processor to execute the various algorithms described elsewhere herein, including machine learning related algorithms. For instance, system memory 108 may store a VAE instructions module 112 that includes processor- or computer-readable instructions to provide a variational autoencoder. Such provision may comprise training and/or performing inference with a variational autoencoder, e.g., as described in greater detail herein.

In some implementations system memory 108 may store processor- or computer-readable calculation instructions and/or data to perform pre-processing, co-processing, and post-processing to analog computer 104. System memory 108 may store a set of analog computer interface instructions to interact with analog computer 104. When executed, the stored instructions and/or data cause the system to operate as a special purpose machine.

Analog computer 104 may include at least one analog processor such as quantum processor 114. Analog computer 104 can be provided in an isolated environment, for example, in an isolated environment that shields the internal elements of the quantum computer from heat, magnetic field, and other external noise (not shown). The isolated environment may include a refrigerator, for instance a dilution refrigerator, operable to cryogenically cool the analog processor, for example to temperature below approximately 1° Kelvin.

Architecture for VAE-Based Collaborative Filtering

Figure 2A:
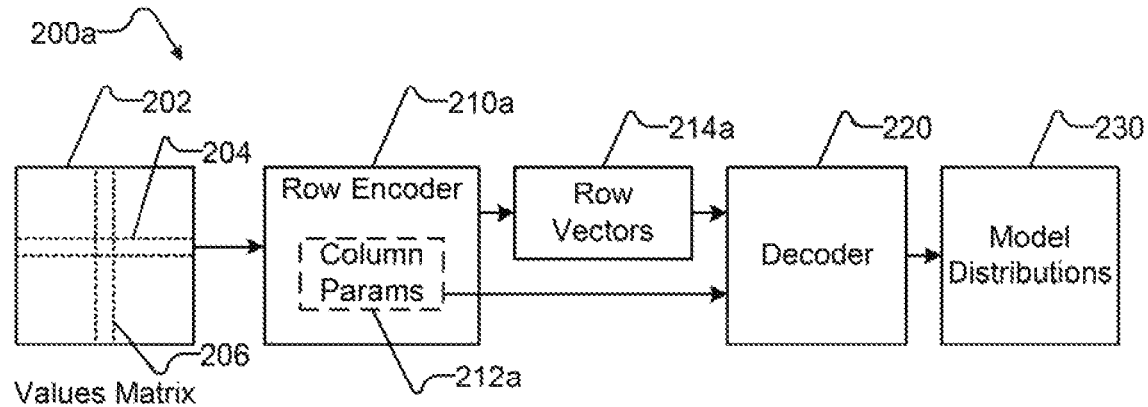
FIG. 2A is a schematic diagram of an example one-VAE implementation of an example collaborative filtering system according to the present disclosure.

FIG. 2A is a schematic diagram of an example single-VAE collaborative filtering system 200a. System 200a receives input data 202 and produces a model distribution 230, which may itself be used to produce a further result, such as a recommendation, prediction, or other inference.

Input data 202 comprises values associated with at least two dimensions, referred to herein as the row and column dimensions. For example, input data 202 may comprise ratings (values) assigned by users (each corresponding to a row 204, i.e., an element in the row dimension) to items (each corresponding to a column 206, i.e., an element in the column dimension). Values are not limited to ratings, and may instead (or additionally) include other row-column relationships, such as user-item interactions (e.g., the number of times a user has listened to a song or whether a user has opened an item description without further engaging) Each value is associated with a row-column pair; for instance, if a user rates a particular product in an online store with 5 stars, the value for the corresponding row-item pair might be "5" and the model distribution may comprise a distribution of probabilities over possible ratings. As described in greater detail below, the model distribution may be a joint distribution over multiple variables. Input data 202 may thus be described as a values matrix (or "ratings matrix"), although as noted previously input data 202 is not necessarily represented as a matrix in the memory of computing system 100.

At a high level, system 200a comprises one VAE modelling input data 202 with a model distribution, generally described in two parts as a prior distribution $p(z)$ and a conditional likelihood $p(x|z)$. The VAE is characterized by parameters $\theta$, corresponding to the parameters of the model distribution, and parameters $\phi$, corresponding to the parameters of the approximating posterior distribution $q(z|x)$ (which approximates $p(z|x)$). The VAE has an encoder 210a which embodies the approximating posterior $q(z|x)$ and is parametrized at least by parameters $\phi$. The VAE further has a decoder 220 which embodies at least a part of distribution $p(x|z)$ and is parametrized by parameters $\theta$. (As described in greater detail below, encoder 210a may embody part of distribution $p(x|z)$ and may be further parametrized by at least a subset of parameters $\theta$.) These terms—the approximating posterior, model distribution, and parameters $\phi$ and $\theta$) are each introduced and described in greater detail herein.

The VAE receives input data across rows 204 or columns 206 of input data 202. For convenience, the following description will assume (without loss of generality) that the VAE receives rows 204 as input, and accordingly encoder 210a may be referred to herein as a row-wise encoder. In at least some implementations, the decoder receives (encoded) data relating to both rows and columns as input and so is not designated as row-wise or column-wise.

Row-wise encoder 210a receives one or more input rows 204 and produces one or more corresponding encoded row vectors 214a. Each row vector 214a is provided to decoder 220 to produce a model distribution for a given row-item pair (where the row element of the row-item pair is the row associated with the input and encoded row vectors 204 and 214a). To generate model distribution 230, decoder 220 may require information about the corresponding column of the row-column pair, so in at least some implementations row-wise encoder 210a learns a set of column parameters 212a to provide to decoder 220.

In some implementations, column parameters 212a comprise a matrix with a column dimension having dimensionality n (e.g., corresponding to n items) and a hidden dimension with dimensionality d. Equivalently, column parameters 212a may be described as a set of hidden vectors, each hidden vector corresponding to a particular column and having d elements. In some implementations, dimensionality d is the same as the dimensionality of encoded row vectors 214a; in some implementations, these dimensionalities are different. The hidden vector for the column element of the row-column pair may be provided to decoder 220.

Encoder 210a constructs a distribution over the latent space for each input row vector 204; this distribution may be referred to as a latent distribution. The latent space and latent distribution may have a dimensionality which may be the same as or different than the hidden dimensionality d of column parameters 212a. Encoded row vector 214a is generated based on the latent distribution. For example, encoder 210a may sample from the latent distribution to obtain encoded row vector 214a. As another example, encoder 210 may (optionally) deterministically transform such a sample to obtain encoded row vector 214a; such transformations are described in greater detail below. In some implementations, the sample from the latent distribution is transformed to encoded row vector 214a (e.g., via a neural network) having hidden dimensionality c, which may be the same as or different than hidden dimensionality d.

Transforming a value from the latent space into a different space to produce encoded vector 214a, as described above (and further described below), can allow for more convenient combination of the encoded vector 214a and learned parameters 212a prior to (and/or as an early phase of) decoding. Although it is possible to combine the latent-space value and learned parameters 212a without first transforming the latent space value into a different space, in general this is likely to require more complex and/or parametrized transformations. This is because the latent space is typically naturally structured to accommodate the parametrized form of p(z), e.g., via training on the KL-divergence between the approximating posterior q(z|x) and prior p(z), as described below. However, the space in which the KL-divergence is minimized may not be the optimal space for combining encoded vector 214a and learned parameters 212a, particularly if one desires to combine them using a simple, unparameterized function (e.g., element-wise multiplication or dot-product). The above-described transformation may enable such a combination. However, such a transformation is not required, and the VAE may perform a (likely non-trivial) merge operation directly on a latent-space sample and learned parameters 212a.

Figure 2B:
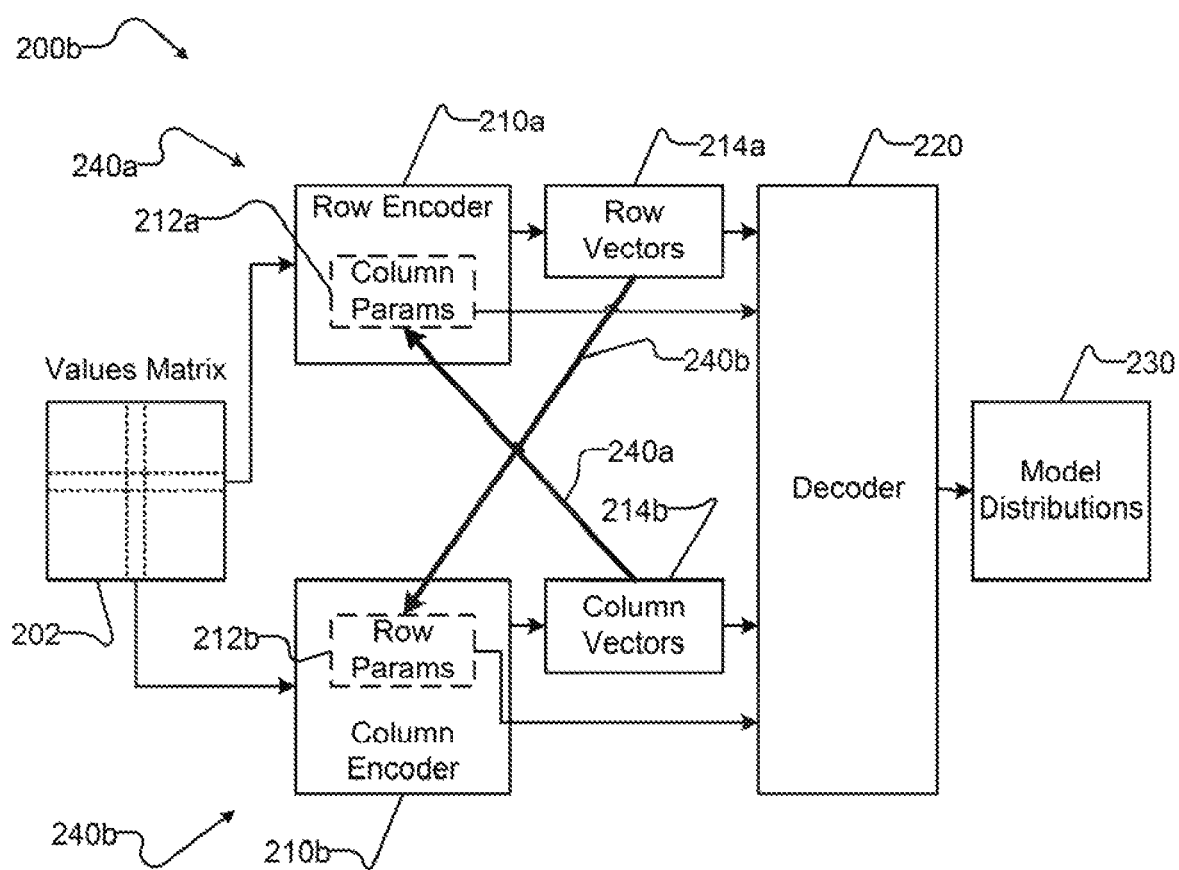
FIG. 2B is a schematic diagram of an example two-VAE implementation of an example collaborative filtering system according to the present disclosure.

The present disclosure is not limited to single-VAE implementations. System 200a may be extended to comprise additional VAEs (e.g., as shown in FIG. 2B, described below).

Figure 3:
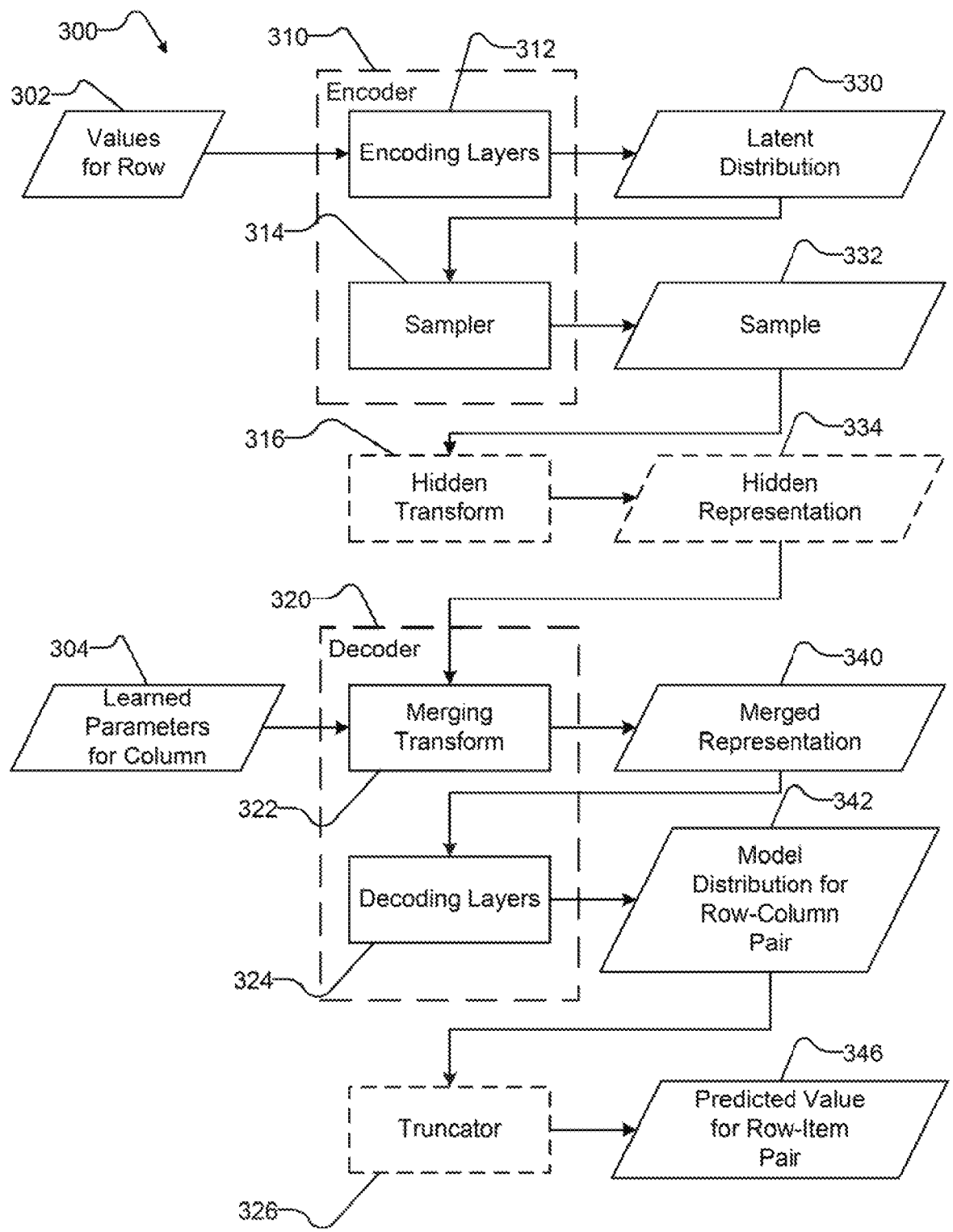
FIG. 3 is a schematic diagram of data flow interactions between components of the example collaborative filtering system of FIG. 2A.

The operation of system 200a is illustrated in greater detail in FIG. 3, which schematically shows data flow interactions between modules of an example implementation system 300 of system 200a. Encoder 310 receives at least one input row vector 302 comprising values for a given row (e.g., observed ratings of a particular user, values corresponding to the user not having rated an item, and/or values corresponding to certain interactions between the user and an item). The values of input row vector 302 may comprise a value for each column, or only a subset of the columns (in which case the remaining values may be assumed to be zero or an equivalent value). Encoding layers 312 generate a latent distribution 330 over the latent space of encoder 310 that corresponds to input row vector 302. Latent distribution 330 is an instance of an approximating posterior distribution, denoted q(z|x) (where z is in the latent space and x is in the input space). The output of encoding layers 312 may comprise any suitable form; for example, in a relatively simple case, encoding layers 312 may output the mean and (log) standard deviation of a Gaussian (normal) distribution.

Generating a latent distribution comprises applying an approximating posterior (which is distinct from the prior distribution over the latent space) to input row vector, and may comprise one or more transformations of input row vector 302. In some implementations, encoder 310 first transforms input row vector 302 based on one or more learned parameters—for example, at encoding layers 312, the input row vector may be multiplied by a d×n matrix consisting of a d-dimensional vector for each of n items in data set 202. The d×n matrix may be a learned parameter of encoder 310. In some implementations the d×n matrix comprises learned column parameters 214a and/or 304. In some implementations, the d×n matrix is a set of parameters distinct from those of parameters 214a and/or 304. The transformed input row vector may then be passed through one or more hidden layers of encoder 310. In some implementations, the magnitude of the transformed input row vector is normalized during the encoding process (e.g., before being passed to the first hidden layer).

In some implementations, encoder 310 learns parameters for transforming values into a richer representation of those values. For example, if values are discrete (e.g., a rating from 1-5 stars), then each value 1-5 may be associated with a learned values parameter vector with dimensionality $d_v$, denoted v[r(u,i)] (where u and i are indexes for the row (user) and column (item) and r(u,i) is the value (rating) associated with the row-column (user-item) pair (u,i)). Row-wise encoder 310 may transform input row vector 302 at an early stage of encoding layers 312 (e.g., as a bilinear first layer) based on learned values parameter vectors v[r], thereby yielding a transformed input vector which may be referred to as an embedded vector emb[u], where u is the input row vector. The embedded vector may be further transformed by further layers of encoding layers 312.

In some implementations, the embedded vector may be determined according to the following formula:

$$emb[u] = \sum_{i \in columns} e[i] \odot v[r(u, i)]$$

where $\odot$ denotes element-wise multiplication and e[i] is a vector associated with column i. Vector e[i] may comprise learned parameters 304 (described below), a distinct set of learned parameters, output from a column-wise encoder, and/or another suitable set of parameters describing columns in the input space. Using learned parameters 304 for vector e[i] will generally reduce the number of free parameters which must be trained, and so may provide certain advantages, but the inventor has found, through experiment, that in at least some circumstances there is a performance benefit to using a distinct set of parameters with higher dimensionality than learned parameters 304.

In some implementations, row-wise encoder 310 applies a normalization for each row element (e.g., for each user) at one or more layers of encoding layers 312. For example, to account for users who have rated disproportionately many items relative to other users (which can introduce large variance during batch normalization and/or cause such users to dominate latent distribution 330), encoder 310 may apply an L2 normalization for each user prior to the first batch normalization of the neural network. This can provide particular performance benefits, in at least some circumstances, when minibatching is used in training. In some implementations which support minibatching, an L2 normalization is applied to the embedded vector before any layers applying a batch normalization and no L2 normalizations are applied between the first and last batch normalizations of encoding layers 312; further L2 normalizations may optionally be applied after the last batch normalization.

Once a latent distribution 330 has been generated in the latent space of encoder 310, a sampler 314 of encoder 310 samples from latent distribution 330 to obtain a sample 332. In some implementations, stochastic sampling is performed by sampler 314 at training time, whereas during inference (i.e., at "test time"), a deterministic process may be used to extract a value from the latent space. For instance, sampler 314 may extract the value by determining an expected value of latent distribution 330. Alternatively, or in addition, sampler 314 may find a mode or apply any other suitable deterministic process. For convenience, the sampled or extracted value will be referred to hereinafter as "sample 332".

In some implementations, the VAE of system 300 applies a hidden transformation 316 to sample 332 to generate a hidden representation 334. Hidden transformation 316 may comprise, for example, a neural network. It can be desirable to expand sample 332 prior to providing it to decoder 320 for merging with learned parameters 304. For instance, learned parameters 304 may have different dimensionality than sample 332 (e.g., since sample 332 has the dimensionality of the latent space, which is typically low-dimensional due to regularization constraints), and having the same or similar dimensionality between the encoded vector 214a and column parameters 212a may be convenient and/or advantageous. In some implementations, hidden transformation 316 transforms sample 332 to a higher-dimensionality representation. However, hidden transformation 316 is optional (provided that decoder 320 is capable of receiving sample 332 without such transformation).

Hidden transform 316 may be considered to be part of encoder 310, part of decoder 320, and/or an intermediate module between encoder 310 and decoder 320. Those skilled in the art of collaborative filtering will be familiar with the user and item matrixes U and V of matrix factorization techniques; hidden representation 334 may be analogized to user matrix U and learned column vector 304 may be analogized to item matrix V (particularly if the two vectors have corresponding dimensionalities). In that context, it may be convenient to consider hidden transform 316 to be part of encoder 310. Alternatively (or in addition), those skilled in the art of variational autoencoding may be more familiar with the output of encoder 310 being a sample drawn from a latent distribution and being represented in the latent space of encoder 310. In that context, it may be convenient to consider hidden transform 316 to be part of decoder 320. Neither such interpretation is necessary; indeed, as illustrated, hidden transform 316 is not included within the bounds of either encoder 310 or decoder 320, which is also acceptable.

Without loss of generality, it will be assumed for convenience that hidden transform 316 (if it is provided by a given implementation) is considered to be part of encoder 310 and that encoded row vectors 214a comprise hidden representation 334 (or sample 332, if there is no hidden transformation 316). This makes it convenient to refer generally to sample 332 or hidden representation 334 (as appropriate) as the "encoded vector". In the case of a row-wise VAE, it may be referred to as an "encoded row vector".

Decoder 320 receives the encoded row vector and the learned column parameters 304 (corresponding to the column of the row-column pair for which a model distribution is desired). Decoder 320 merges the encoded row vector and the learned column parameters 304 by applying a merging transformation 322, yielding a merged representation 340. Where learned column parameters are representable as a vector, merging transformation 322 may comprise, for example, determining the dot product of the two vectors (i.e., encoded row vector and learned column parameters 304), concatenating the two vectors, and/or performing an element-wise multiplication of the two vectors. For example, if the encoded row vector and a vector of learned column parameters 304 have different dimensionality, merging transformation 322 may comprise performing the element-wise multiplication over the first n elements of the vectors (where n is the dimensionality of the lower-dimensionality vector) and concatenating the remainder of the higher-dimensionality vector to the result.

Decoding layers 324 of decoder 320 receive merged representation 340 and generate a model distribution for the row-column pair (corresponding to the row of the input row vector 302 and the column of the learned column parameters 304). Decoding layers 324 may comprise, for example, one or more layers of a neural network. Decoding layers 324 may provide model distribution 342 as, for example, the mean and standard distribution of a Gaussian distribution, the logit inputs to a softmax function from which a multinomial distribution may be constructed, an autoregressive distribution (e.g., a NADE or DARN over all columns for a single row, all rows for a single column, or over all or part of the row/column space), and/or any other suitable representation of a distribution.

When performing inference (i.e., post-training, at test time), the VAE may determine a predicted value 346 based on model distribution 342. Predicted value 346 may comprise, for example, a predicted rating for a user-item pair associated with model distribution 342. Determining predicted value 346 may comprise, for example, determining an expected value of model distribution 342, and/or determining a further distribution based on model distribution 342 (e.g., by marginalizing one or more variables of model distribution 342 and/or conditioning model distribution 342). Truncator 346 may optionally determine such further (e.g., conditional or marginal) distributions from model distribution 342, as described in greater detail below.

Training

In training, the parameters of the VAE (e.g., the parameters of encoder 310, including learned column parameters 304, and any parameters of decoder 320) may be trained according to a loss function. The loss function may comprise, for example, a lower bound on the log likelihood of the observed values (i.e., input data 202), such as the ELBO. In at least some implementations, the loss function $\mathcal{L}$ may be based on (and/or expressible as) the following formula:

$$\mathcal{L} = \mathbb{E}_{q(z|x)}[\log p(x|z)] - KL[q(z|x) \| p(z)]$$

where the KL term denotes the Kullback-Liebler divergence. In some embodiments, the loss function is importance-weighted.

The loss function may, optionally, further comprise regularization terms to aid in training learned column vector 212a, learned column parameters 304, and/or parameters φ and/or θ of encoding layers 312 and decoding layers 324 (which may also parametrize hidden transform 316). For instance, in some implementations where model distribution 342 is a multinomial or similar distribution, the loss function comprises an L2 regularization on the logits of model distribution 342. In some implementations, the loss function comprises an L1/L2 regularization term (that is, a ratio of L1 and L2 regularization terms) on teamed parameters 304 as a proxy term for the prior distributions of learned parameters 304. Such a loss function may be based on:

$$\mathcal{L} = \mathbb{E}_{q(z|x)}[\log p(x|z)] - KL[q(z|x) \| p(z)] - \frac{L1}{L2}[\ell]$$

where $\ell$ denotes learned columns parameters 304.

FIG. 4 is a flowchart of an example method 400 for training a VAE-based collaborative filtering system, such as example systems 200a, 200b (described below), and/or 300. At act 405, the system receives an input (e.g., at an encoder 310) and, at act 410, encodes the input into a distribution over the latent space (e.g., via encoding layers 312, yielding latent distribution 330). At act 415, the system samples from the distribution of act 410 (e.g., via sampler 314, yielding sample 332). At act 420, the sample is decoded into a model distribution over the input space. Acts 415 and/or 420 may optionally further comprise transforming the sample (e.g., via hidden transformation 316, yielding hidden transformation 334). At act 425, the system determines a loss value based on the model distribution (e.g., based on a loss function $\mathcal{L}$, described above). These acts are described in greater detail above, and set the scene for the act 430.

At act 430, the system trains the parameters φ and θ of the VAE. Training may be based on the Kullback-Liebler divergence between the approximating posterior distribution q(z|x) (having parameters φ) and the prior distribution p(z) (having parameters θ). Act 430 may comprise computing gradients (e.g., by backpropagation) of the loss function through the network and updating the parameters φ and θ via a training technique, e.g., via a gradient-based technique such as adaptive moment estimation (aka Adam), root mean square propagation (aka RMSProp), stochastic gradient descent (aka SGD, kSGD, etc.), gradient descent, or any other suitable technique.

In some implementations, the system trains parameters over minibatches (i.e., subsets of available input data). For example, in a row-wise VAE such as the VAE of system 200a, the VAE may be trained over a plurality of minibatches of rows 204 of input data 202. This is made feasible by training learned column parameters 212a and/or 304, which avoid the need to train over all connected row-column pairs in one epoch (although such training is still possible in the presently-disclosed systems and methods).

In some implementations, minibatches comprise subsets of rows 204 and columns 206—that is, training may proceed by minibatching over both columns 206 and rows 204. For example, in user-item datasets there may be very large numbers of users (e.g., many users of a video streaming service relative to a comparatively small number of videos). It may not be desirable, feasible, or possible to train an item-wise (e.g., column-wise) VAE over all users (e.g., rows) in each minibatch, so minibatches may include input data on user-item pairs for only a subset of users and a subset of items.

In at least some implementations, this will result in non-zero gradients being produced for only a subset of the learned parameters 304 on each minibatch—that is, some learned parameters 304 will be associated only with zero-valued gradients for the minibatch. This can disrupt training techniques which involve measurements of gradients over time (e.g., Adam), since the observed variance of the gradients of learned parameters 304 will be driven by the order in which minibatches are trained. In some implementations, this issue is avoided or ameliorated by using techniques which do not depend on measurements of the gradient over time, such as gradient descent.

In some implementations, the system trains parameters on implicit data (such as whether values are observed and/or row-column interactions). In at least some such implementations, the system scales down the loss function components associated with at least one aspect of the implicit data. Implicit data can be quite sparse in at least some datasets, so there may be a significant imbalance between, for example, observed versus unobserved values or a user's watched versus unwatched items. The system may scale down the components associated with unobserved values or unwatched items, e.g., when these tend to dominate the dataset. This potentially reduces a likelihood that the system will later predict that all values are unobserved or that all interactions are absent (e.g., that all videos are unrated and unwatched). In some implementations, the system subsamples the implicit data—for instance, the number of unobserved row-column pairs included in training may be a function of the number of observed row-column pairs (e.g., the number of unobserved pairs trained on might be limited to a constant multiple of observed pairs). This will tend to increase variable, but may potentially provide a substantial performance benefit in training.

Modelling Information Beyond Values

In some implementations, model distribution 342 is a distribution over values in the input space and/or other characteristics of the row-column pair. For example, where values are categorical (e.g., 1-5 stars), model distribution 342 may model each of the categories of value; for instance, model distribution 342 may model p(r(u,i)=1), p(r(u,i)=2), p(r(u,i)=3), p(r(u,i)=4), and p(r(u,i)=5) where r(u,i) is the rating for a user-item pair with possible (integer) values of 1-5.

As another example, in some implementations the probability that a value is not observed for a given row-column pair may be explicitly represented (e.g., as discussed above). Model distribution 342 may model probabilities of values and probabilities that values are not observed. These may be modelled separately, so that (for example) the distribution over values follows one form of distribution and the distribution over observations follows another. This allows the system to weight each variable, which allows for tuning of variables to avoid certain observations dominating predictions. A distribution of predicted values may then be obtained by conditioning model distribution 342 on the values being observed, and a prediction may be made based on that conditional distribution (e.g., by finding the expected value).

In some implementations, "unobserved" is modelled as a type (or category) of value. Model distribution 342 may model each of the categories of value including "unobserved" and the k possible observed values. In a user-item ratings context, this might correspond to representing an unrated user-item pair as having a 0 rating and retaining the (for instance) 1-5 stars permitted for observed ratings. Alternatively, or additionally, the system may model a distribution over observed/unobserved and another distribution over value for row-column pairs given that the row-column pairs are observed. A model distribution 342 over values may then be provided by p(unrated), p(value 1|rated)·p(rated), . . . , p(value n|rated)·p(rated).

In the context of a VAE, explicitly modelling the set of unobserved values may be thought of as being analogous to applying a (potentially-overwhelming) dropout to the input and on the loss function (or output), in distinction to conventional input-only dropout techniques. VAEs tend to be particularly sensitive to dropout, so explicitly representing the set of unobserved values may improve performance in certain circumstances. Note that modelling the set of observed values is not necessarily equivalent to modelling the observed values themselves (although the two are not necessarily mutually exclusive, so a system may do both). The set of observed values implicitly defines the set of unobserved values, whereas the observed values themselves do not necessarily provide any information about the (potentially larger) set of unobserved values. For certain datasets the information conveyed by explicit representation of unobserved values can be powerful—potentially even more so than the information conveyed by the values themselves.

For example, in a large online video service, most users are likely to have not rated most items—in some datasets, the sparsity of observed ratings can be on the order of 1%, which corresponds to a 99% dropout (if unobserved ratings are ignored). However, the set of rated items can reflect user preferences (as undesired items are, most commonly, not watched and thus not rated). Consider that with n items, of which r are rated, there are $$\binom{n}{r}$$

possible item choices, with $$\left(\frac{n}{r}\right)^r \le \binom{n}{r} \le \left(\frac{n \cdot e}{r}\right)^r,$$

but only $k^r$ ratings choices for those items (where k is the number of possible observed ratings—e.g., k=5 in a 1-5 star rating system). In sparse datasets, it is common for n/r»k, so the arrangement of which items have observed ratings (versus which do not) is potentially a much richer source of information than the ratings themselves.

In some implementations, model distribution 342 interprets values as categorical (as opposed to continuous). For instance, model distribution 342 may comprise a categorical distribution parametrized by a softmax over the possible values for each row-column pair (including, optionally, unobserved values). This ensures that all probability is assigned to allowed values; in particular, no probability can be assigned to values outside the allowed range (e.g., no probability will be assigned to a rating of a non-integral number of stars, such as 3.5 stars, if such ratings are not permitted). The "unobserved" designation need not be considered to be qualitatively different than the k possible observed values, so it may be included as the $(k+1)^{th}$ category, which may enable the use of efficient sparse linear algebra libraries. (Encoder 310 may be configured to receive or determine, for example, a one-hot encoding as input representing these categories). It is worth noting that "unobserved" is likely not to scale linearly with the other categories of possible values, so it can be advantageous in at least some such implementations to embed values based on rich hidden representations as described above.

Model distribution 342 may be based on so-called "side information", such as information derived from secondary sources pertaining to particular columns and/or rows (e.g., reviews of a particular item or users' stated preferences or biographical details). Alternatively, or in addition, model distribution 342 may be based on information describing certain row/column interactions. For instance, in an online video context, this could include representing whether a user has watched a particular video (item), regardless of whether the user has rated that item. Such side or interaction information may be represented in input vector 302 and/or in other input provided to encoder 310, which may use the information to inform latent representations for rows and/or columns.

In some user-item implementations, the system implements a bias term that explicitly captures a probability that a user is unaware of an item. Such a bias term may be implemented in the decoder as a parameter; for instance, the bias term may comprise a set of learned parameters analogous to learned parameters 304 and, if each parameter is distinct for each item but shared across all users (or vice-versa) may be trained in substantially the same way as learned parameters 304 are trained. It is also (or alternatively) possible for such bias terms to be specific to individual user-item pairs, although this may require heavy regularization to limit the potential for such bias terms to absorb much of the modelling power of the VAE. Alternatively, or in addition, the bias term may comprise a parameterization of model distribution 342 without necessarily comprising a separately-trained parameter.

Models of user awareness may be supplemented by additional variables, such as a user's propensity to avoid certain items and/or whether a user has interacted with (or is likely to interact with) an item. For example, decoding layers 324 may be parametrized to produce one or more of p(unaware), p(avoids|unaware), p(rating=i|interacts). Decoding layers may thus (for example) generate a model distribution 342 described by one or more of:

$p$(unrated)=$p$(unaware)+(1−$p$(unaware))·$p$(avoids|aware)

$p$(rating=$i$)=$p$(rating=$i$|interacts)·(1−$p$(unaware))·(1−$p$(avoids|aware))Inference As noted above, the VAE may determine a predicted value 346. In the simplest case, this might involve determining an expected value (or some other statistic) from model distribution 342. For example, where the predicted value 346 is a predicted rating and model distribution is defined exclusively over ratings, then predicted value 346 may be the expected value of model distribution 342 without necessarily engaging (or even providing) truncator 326.

FIG. 5 is a flowchart of an example method 500 for performing inference with a VAE-based collaborative filtering system, such as example systems 200a, 200b (described below), and/or 300. Acts 505, 510, and 520 correspond generally to acts 405, 410, and 420, respectively. Act 515 involves extracting a sample (without necessarily sampling, as noted above) from the latent distribution produced at act 510. The extraction of act 515 may be deterministic and may, for example, involve determining an expected value, mode, or other statistic of the latent distribution.

At act 525, the system may optionally reduce the values and/or variables modelled by the model distribution produced at act 520 to target the values and/or variables for which a prediction is required, thereby yielding a truncated distribution over the targeted values and/or variables. For instance, the system may determine conditional and/or marginalized distributions based on the model distribution, e.g., via truncator 326 as described below.

At act 530, the system infers a prediction based on the model distribution produced at act 520 (which may comprise inferring a prediction based on the truncated distribution produced at act 525). This act goes by many names—"prediction", "recommendation", and other terms are used; each of these is included in this specification's (and the appended claims') use of "infer", which is not intended to be limiting. This may involve, for example, determining an expectation value of the model distribution produced at act 520 and/or a truncated distribution produced at act 530.

Where model distribution 342 models information that is not explicitly part of the desired predicted value, such information may be removed by truncator 326. In some implementations, truncator 326 determines conditional distributions given certain values (e.g., given that certain user-item pairs are rated) and/or marginalizes out certain variables. Act 530 may then comprise drawing a predicted value 346 from the resulting distribution (e.g., by determining an expected value), thereby yielding predictions only for the values and/or variables of interest. In some implementations, model distribution 342 comprises information on row/column interactions (e.g., as described below) and truncator 326 determines a distribution over values conditional on an interaction existing (or, alternatively, not existing) between the row and column.

For example, in a user-item ratings implementation with discrete ratings where "unrated" is represented as a type of rating, truncator 326 may remove a logit associated with an unrated value and then apply a softmax, thereby conditioning on the user-item rating being observed. As another example, e.g., in a continuous-ratings implementation, model distribution 342 might comprise distributions p(rated) and p(rating|rated), in which case truncator 326 might select p(rating|rated) at act 525.

As another example, also in a user-items implementation, act 525 may comprise marginalizing or otherwise reducing the presence of one or more variables for which the true value is unrated. Truncator 326 may also, or alternatively, condition or marginalize out implicit or side information so as to focus on the values and/or variables of interest.

None of the foregoing description is intended to be limited to row-wise VAEs. A column-wise VAE may be implemented according to the present disclosure simply by swapping the terms "row" and "column" wherever they appear above. Thus, in a user/item context, an item-based VAE may be constructed in substantially the same way as a user-based VAE. Of course, it is equally valid to say that items may be represented along rows rather than columns, as the user-row/item-column convention used in examples herein is purely a matter of nomenclature.

Extending to Multiple VAEs

Although the foregoing description refers generally to systems providing one VAE, the present disclosure is not limited to such implementations. Indeed, the presently-described systems and methods can, in certain circumstances, provide further advantages with the addition of one or more further VAEs. For instance, the training of learned parameters 212a and/or 304 (over columns) may be assisted by the addition of a paired VAE (also over columns) by binding such learned parameters to the output of the paired VAE's encoder during training.

FIG. 2B is a schematic diagram of an example two-VAE implementation of an example collaborative filtering system 200b. System 200b includes all of the elements of system 200a—that is, it includes a row-wise VAE 240a. System 200b further includes a column-wise VAE 240b, which comprises a column-wise encoder 210b and decoder 220. Decoder 220 may be shared between VAEs 240a and 240b (collectively and individually "VAEs 240"), since decoder 220 is defined over both row-wise and column-wise inputs. Alternatively, the VAEs may possess different decoders (although this may increase the total number of parameters to train).

VAEs 240 are complementary, but are not necessarily wholly symmetric; for instance, column-wise encoder 210b may comprise a different architecture for its underlying neural network than row-wise encoder 210a. Indeed, such differences may be desirable in certain circumstances. For instance, if the column dimension is much larger than the row dimension, then it may be desirable to use a lower-dimensional architecture (e.g., an architecture that produces a lower-dimensional latent space), more efficient training algorithm, or an otherwise less complex neural network architecture in column-wise 210b than row-wise encoder 210a (among other possible differences).

Encoder 210b receives input column vectors 206 and has a set of parameters $\phi_c$. Parameters $\phi_c$ may be disjoint from parameters $\phi_r$ of encoder 210a. Alternatively, encoders 210a and 210b (collectively and individually "encoders 210") may share one or more non-θ parameters between sets $\phi_r$ and $\phi_c$. Encoder 210b has learned row parameters 212b and outputs encoded column vectors 214b, which it provides to decoder 220. In general, VAEs 240 may be constructed and operated as described above (with reference to single-VAE systems 200a and 300 and associated methods 400 and 500), subject to certain features and variations discussed below. For example, column-wise VAE 240b may be trained according to method 400, subject (in some implementations) to alternating minibatches between VAEs 240 as described below.

In some implementations, training each VAE 240 involves assisting its learned parameters 212a or 212b (collectively and individually "learned parameters 212") based on the output of the complementary VAE 240, such as encoded vectors 214a or 214b (collectively and individually "encoded vectors 214"). For example, training VAE 240a may comprise adding a regularization term to the loss function $\mathcal{L}$ which penalizes differences between learned column parameters 212a and encoded column vectors 214b.

The regularization term may comprise, for example, L2 regularization between the learned column parameters 212a and complementary encoded column vectors 214b. The regularization term may be backpropagated across the VAE 240 being trained during training act 430. In some implementations, this regularization term is included instead of the L1/L2 regularization term on learned parameters 212 described above. In some implementations, the regularization term is scaled by a scaling factor based on the step size used to train a linked lookup table of the VAE 240. For example, the scaling factor may be the inverse of the step size.

A regularization term between the learned parameters 212 of a VAE 240 and the output of the complementary VAE 240 may assist in the training of learned parameters 212, thereby potentially reducing the representational burden of training learned parameters 212. Learned parameters 212 can comprise a large number of parameters, which usually implies that significant amounts of training data is required to avoid overfitting. However, regularizing the training of learned parameters 212 with the complementary VAE 240 allows for more powerful architectures to be used with a reduced potential for overfitting given the same quantity of training data. Parameters regularized in this way may be referred to as "assisted parameters" (as opposed to free parameters). Reducing the total number of free parameters that system 200b must train may, in at least some circumstances, provide an efficiency benefit in training and/or an accuracy benefit in inference. The number of free parameters may be further reduced, in some implementations, by using learned parameters 212 to generate the initial embedding of the input vector in encoding layers 312 of either or both encoders 310, as described above.

In some implementations, neither VAE 240 has any per-row or per-column free parameters. Since per-row and per-column free parameters can add substantially to the complexity of training (particularly where the dimensionality of the row and column dimensions is very large), such implementations may obtain performance advantages in some circumstances. In some implementations, one or more sets of free parameters of the lower-dimensional dimension (e.g., rows, if there are more columns than rows) are trained by one VAE 240, whereas the other VAE 240 eliminates such free parameters of the higher-dimensional dimension.

In some implementations, training method 400 comprises alternating minibatches between VAEs 240. For example, method 400 may be performed over the course of one minibatch of row input vectors 204 to row-wise VAE 240a, during which time the non-shared parameters of column-wise VAE 240b are kept static, followed by performing method 400 over the course of a minibatch of column input vectors 206 to column-wise VAE 240b, during which time the non-shared parameters of row-wise VAE 240a are kept static.

System 200b may be equivalently conceptualized as a single VAE over the whole input space (as opposed to two VAEs 240 over respective row and column dimensions of the input space). Such a VAE may comprise an approximating posterior distribution which is factorized into two mutually-independent components, each dependent on rows and columns, respectively. The prior distribution of the VAE may be defined over the input space, e.g., as a function of encoded row and column vectors. The structure of system 200b implicitly results from such a construction. Accordingly, it will be appreciated that such "single-VAE" implementations over the input space fall within the scope of the present disclosure and the appended claims.

System 200b may comprise additional VAEs. For example, if the input space is multidimensional (beyond two dimensions), system 200b may be extended to three or more VAEs, with one VAE for each dimension. Training of learned parameters 212 of each VAE 240 may be assisted by output of each of the complementary VAEs 240.

As another example, further VAEs may be added to system 200a or system 200b to represent side-information. For instance, if textual information associated with columns are available (e.g., reviews of movies, where movies are represented along the column dimension of input data 202), an additional VAE implementing a topic model over the text may be added to the system. Its output (e.g., its latent representation, its predictions) may be provided as an input to one or more of VAEs 240.

Hierarchical and/or Discrete Variational Autoencoders

Some data sets correspond to strongly multimodal distributions. For instance, individuals tend to have multimodal music preferences where they might listen to certain types of music only while working, driving, exercising, reading, or relaxing, and other types of music not at all. Moreover, people can have fine discriminations in taste. Even though a person likes a genre in general, they may hate particular exemplars of that genre; similarly, they may like just a few bands in a genre, but dislike it in general. Such multimodalities require a latent space (and latent distribution) with a very rich representation to capture these details, but must also be regularized to allow the VAE to make sensible guesses in the absence of overwhelming data.

In some implementations, one or more VAEs 240 use hierarchical prior and approximating posterior distributions (as described, for example, by Rolfe, "Discrete Variational Autoencoders", arXiv:1609.02200v2 [stat.ML] 22 Apr. 2017, incorporated herein by reference). The approximating posterior and prior distributions may have matched structures. Such VAEs can, in certain circumstances, provide very multi-modal distributions.

In some implementations, such hierarchical models may be trained according to a slow warm-up routine. The loss function is warmed up initially by reducing the magnitude of the KL factor (e.g., by applying a scaling term). The loss function is subsequently "cooled" by increasing the magnitude of the KL term towards its un-reduced value. This cooling can be gradual, e.g., by gradually increasing the KL scaling term towards a value of 1. Cooling can be performed across the entire network simultaneously and/or cooling can be done layer-by-layer (e.g., starting with the bottommost layer and proceeding upwards). This has a tendency to force more of the representation into higher-level layers in the representation (which typically uses the fewest latent variables). Allowing higher-level layers to be "warmer" for longer can allow representation to flow into them and may relieve representational pressure on lower-level layers.

In some implementations, the one or more hierarchical VAEs provided by the system comprise discrete variational autoencoders (e.g., as described in the aforementioned paper). Such discrete VAEs may provide greater modelling power when representing multimodal distributions. For example, when a hierarchical approximating posterior is used, the DVAE can produce very multi-modal approximating posteriors.

Biases

In some implementations, one or more VAEs 240 provide at least one of: a row bias (constant with respect to each row 204 in the input space) and a column bias (constant with respect to each column in 206 in the input space). For each VAE 240, a final bias in the decoder 220 may optionally implement the bias for the complementary dimension—for instance, for the row-wise VAE 240a, the decoder 220 may provide a column bias, since VAE 240a predicts the distribution of column-values for a given row. The same is true (vice-versa) for column-wise VAE 240b. The aligned bias (i.e., the row bias in the row-wise VAE and the column bias in the column-wise VAE) may optionally be explicitly represented.

In some implementations, an element of the learned parameters 212 for each VAE 240 is fixed. This fixed value may be set, for example, to 1 (to facilitate merging via the dot product), although this is not necessary in all such implementations. If merging transformation 322 involves determining a dot product of (at least a part of) the encoded vector 214 and learned parameters 212, then the corresponding element to the fixed element in the encoded vector 214 (i.e., the element with the same positional index as the fixed element in a vector of learned parameters 212, but in encoded row vector 214) is effectively a bias term for the VAE to which the encoded vector 214 belongs. That is, if the fixed element is in learned column parameters 212 then the corresponding bias in encoded row vector 214 is a row bias for row VAE 240a (and vice-versa for column VAE 240b).

Alternatively, or in addition, this arrangement of fixed and bias elements can be reversed so that an element of the encoded vector 214 is fixed and the corresponding element of the learned parameters 212 is a bias, although in this case it is a bias for the complementary dimension (e.g., in the row VAE 240a, this bias on learned column parameters 212a is a column bias). The row-based VAE 240 may thus explicitly provide a row-bias, inferred from input row vectors 204, and/or a column bias, learned for each column-wise element of the input space. In some implementations, both row and column biases are explicitly represented in this way, although they must be disjoint—i.e., the two fixed elements cannot not occupy corresponding positional indexes of their respective vectors. In some implementations, no such bias is explicitly represented. In some implementations, only the row bias is explicitly represented in row-wise VAE 240a (and vice-versa for column-wise VAE 240b), leaving any column bias (row-bias) to be optionally separately parametrized as an additive term in a layer of decoder 220 or otherwise represented.

In some implementations, such as implementations where the row or column vectors are computed by a neural network encoder and/or where the row-vectors and column-vectors are fed into a neural network decoder, it can be more practical to represent explicit row- and column-biases in decoder 220. For instance, if the bias is applied directly to the final logits of decoder 220, the computation overhead can be relatively modest; some experiments have shown an addition of just 6 parameters per row and per column even on very large datasets.

Quantum Machine Learning

In some implementations the latent space of encoder 310 comprises a restricted Boltzmann machine (RBM). The system may comprise an interface with a quantum processor 114 (e.g., a quantum annealing processor). Training the VAE(s) may comprise computing a gradient of a KL term with respect to the RBM by representing a distribution by the quantum processor 114, such as a Boltzmann distribution and/or a quantum Boltzmann distribution, and executing the quantum processor to determine a sample output. Training the VAE(s) may further comprise obtaining the sample based on the sample output of the quantum processor. This may involve, for example, post-processing the sample output (e.g., to incorporate quantum error correction or otherwise process the sample output).

Search by Value

Collaborative filtering is sometimes used as a component in search, e.g., in combination with explicit search terms. For example, a user of an online shopping service might input some explicit search terms ("ear-bud headphones", say). The service might return results which satisfy that query and sort them by predicted rating, where the predicted rating is generated via collaborative filtering based on user ratings, user history, and/or other factors.

Such techniques can be effective in appropriate circumstances, but some circumstances can be challenging for them. Examples of such circumstances include those where users are not likely to know the correct technical search terms for their desired item, or where items are not accurately or completely labelled, or where sufficiently precise terms do not exist. For instance, searches with a strong aesthetic component, such as a search for particular styles of clothing or artwork, may be resistant to search techniques heavily reliant on text, particularly where the space of items (columns) is large. Consider that online retailers can have millions of items even in one relatively narrow category (e.g., men's T-shirts) and that many users will have only limited terminology available to further restrict the search space (e.g., "red", "XL", "cotton").

In some implementations, collaborative filtering techniques are used to build an iterative search procedure. Given a large search space for a query by a particular user, a computing system can iteratively generate a set of diverse items. In some implementations, the set of items is diverse, at least for the first iteration. For example, diversity can be pursued by requiring that each of the items have a representation which is spaced apart (e.g., by at least some threshold distance) from each of the other items' representations in the latent space according to some distance metric. The computing system may solicit a rating from the user for one or more of the items in each iteration. The computing system uses these ratings to generate a per-search profile for the user—that is, the search is based on the user's present chain of searches rather than (or in addition to) searches from previous search sessions, which may not be informative. The profile may be generated via collaborative filtering, as discussed above, and may be used to refine the computing system's proposed sets of items in subsequent iterations of the search procedure.

In each subsequent iteration, the computing system generates a new set of items based on at least one of the diversity of the items (relative to each other and/or previously-presented items) and the predicted rating of the items based on the user's pre-search profile. In some implementations, in one or more iterations items are selected based on a weighted combination of diversity and predicted rating (and/or other factors). The weighting can change between iterations. In some implementations, the weighting of diversity decreases and the weighting of the predicted rating increases from one iteration to the next (e.g., by annealing those terms).

As the inferred characterization of the user's preferences becomes more refined, and as the proposed items become more strongly optimized for expected (high) rating, rather than diversity, in suitable circumstances the sets of proposed items may begin to converge to the user's desired items within a number of rounds. The user's ratings may be used to refine a global collaborative filtering system (e.g., one which is not restricted to per-search user profiles but is defined over the entire user-item search space).

Thus, the presently-described techniques use user ratings as the search query (optionally supplemented by text or other input to restrict the search space) and iteratively solicits rounds of rating-queries to build a per-search (e.g., session-based) model of the user's preferences, gradually refining the set of items presented. In suitable circumstances, this may allow the computing system to quickly refine a list of recommended items for a user from an initial broad set of diverse items to a narrow final set of items with the desired properties.

In some implementations, the computing system iterates the search procedure for a fixed number of iterations. In some implementations, the computing system iterates the search procedure for an indeterminate number of iterations; e.g., a user may indicate when they are done searching, and prior to that point the computing system may continue to iterate. In some implementations the computing system allows the weighting on diversity of items to go to 0. In some implementations the computing system requires that the weighting on diversity of items remain non-zero, e.g., by keeping it above a threshold and/or by decreasing it asymptotically. In some iterations the computing system iterates the search procedure cyclically, such that the weightings anneal from an initial state to a final state and then return to the initial state (e.g., by reverting to the initial state in one iteration or by annealing back to the initial state from the final state over a number of iterations).

The foregoing refers to items, users, and ratings for convenience, but it will be appreciated, as described above, that the presently-described techniques can be applied to rows, columns, and row-column values without requiring that the data represented correspond to users, items, and/or ratings. That is, the computing system can search for a high-value (or, optionally, low-value) row-column pair by iteratively soliciting values for sets of proposed columns given a particular row (and/or vice-versa). The proposed sets of columns (or rows) may be determined based on their diversity in the latent space and/or the predicted values at the relevant row-column intersections. This determination may involve weighting a diversity metric, a predicted value, and/or other factors.

Figure 6:
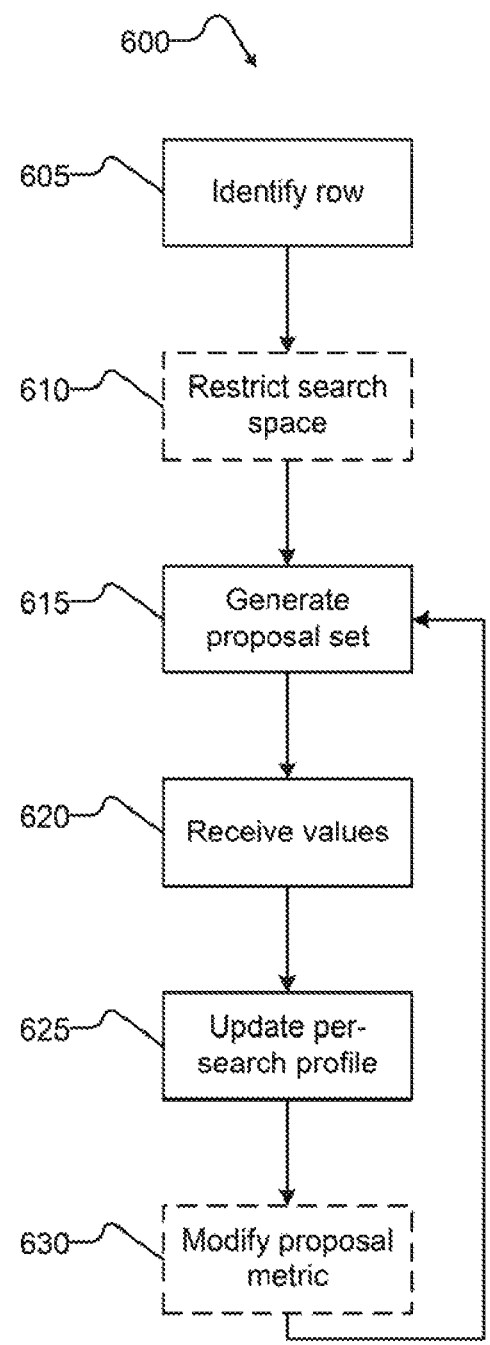
FIG. 6 is a flowchart of an example method for iteratively searching by value with an example row-column collaborative filtering system.

FIG. 6 is a flowchart of an example method 600 for iteratively searching by value by a computing system providing an example row-column collaborative filtering model such as is described above. The computing system may provide, for example, a matrix-factorization collaborative filtering model, a VAE-based collaborative filtering model, and/or any other suitable collaborative filtering model. At 605, a row in the row-column input space of the collaborative filtering model is identified (e.g., by passing to the collaborative filtering model an identifier associated with a user who has initiated a search session). Optionally, at 610, the computing system restricts the search space, e.g., based on a text input or some other indication (e.g., selecting a category of items via a graphical interface) from the user.

At 615, the computing system generates a proposal set of columns (which may comprise a fixed number of columns and/or a variable number of columns, such as a random number or a number determined dynamically based on search history, available resources, or other factors). The columns in the proposal set may be selected by the computing system based on a latent space of the collaborative filtering model and/or based on representations of the one or more columns (e.g., learned column values in a matrix-factorization model). The columns may be selected based on one or more of: diversity and a predicted value for each column based on the given user and a per-search profile. e.g. as described above. In some implementations, the first iteration of 615 for a given search is based on diversity without using the per-search profile (which is not necessarily formed at this stage of the first iteration).

At 620, the computing system receives values associated with one or more of the columns in the previously-generated proposal set. The values may comprise, for example, ratings by a user (i.e., the given row) of the proposed items (i.e., the columns in the proposal set). Ratings may comprise binary ratings (e.g., thumbs-up/thumbs-down), categorical ratings with more than two possible values (e.g., a rating out of five stars), and/or continuous-valued ratings (e.g., a percentage value). The ratings may be provided via a graphical user interface either explicitly (e.g., by selecting a rating from a group of possible ratings) and/or implicitly (e.g., by tracking which items a user interacts with, such as by clicking on them).

At 625, the computing system updates the per-search profile based on the values received at 620. The per-search profile represents the values received in the search. The computing system may use the per-search profile on subsequent iterations to refine the proposal set identified at 615, e.g., by generating a latent representation for the given row based (at least in part) on the per-search profile.

At 630, optionally, a metric for generating a proposal set at 615 may be modified, e.g., by annealing weights associated with a diversity factor and a prediction factor as described above.

Method 600 iterates by returning to 615 and generating a further proposal set. Method 600 may iterate any number of times, including a fixed number (e.g., five 2, 3, 4, 5, or more iterations) and/or a variable number (e.g., iterating until a user ends the search, optionally up to a maximum number of iterations). Values collected at one or more iterations of 620 may optionally be used to further train the collaborative filtering model (in a non-search-specific sense, so that values influence results outside of the search session).

Anomaly Detection

Collaborative filtering approaches may be used to detect anomalous interactions between entities. These can comprise, for example, fraudulent transactions on a credit card network, where the entities include cardholders and merchants. For instance, cardholders may be represented as rows and merchants may be represented as columns. The model may be trained over transaction details (e.g., value, time, and/or other details) rather than (or in addition to) ratings. Entities may be divided into disjoint row-entities and column-entities or each entity may be represented along both row and column dimensions, depending on whether the interactions follow a bipartite scheme.

In some implementations, a computing system provides a collaborative filtering model which associates a hidden vector with each entity. The computing system trains the hidden vectors over a training dataset comprising interaction data (such as transaction details) between row-column pairs. In some implementations, the hidden vectors are fixed and may be trained, e.g., via matrix factorization. In some implementations, the hidden vectors are at least partially inferred from a history of interactions, e.g., via a VAE-based collaborative filtering approach as described above wherein the hidden vector may comprise latent representations of a row-entity and/or column-entity.

In some VAE-based collaborative filtering implementations, the encoder of the VAE comprises a recurrent neural network (e.g., an LSTM and/or GRU) over an interaction history (e.g., recent transactions). The recurrent neural network may be a function of the row-entities and column-entities with which the column-entity and row-entity (respectively) of a given transaction have previously interacted.

Interactions may be labelled as anomalous or non-anomalous (e.g., in the credit card context, they may be labelled as fraudulent or legitimate). In some implementations, a classifier is trained on the latent representations (i.e., hidden vectors) of labelled training dataset inputs. These latent representations are generated by the encoder. The classifier classifies the latent representations as corresponding to anomalous or non-anomalous labels. The classifier may also, optionally, be trained over the non-encoded details of the transaction. The classifier may be trained together with the VAE or separately; we have found by experiment that training the classifier together with the VAE tends to improve results in at least some circumstances.

During inference, a classifier/VAE collaborative filtering scheme as described above does not necessarily require use of the VAE's decoder. Input interactions can be classified as anomalous or non-anomalous by providing the interaction to the encoder, generating a latent representation of the interaction, (optionally) canonicalizing the latent representation to reduce variational noise, providing the latent representation (or canonicalized form thereof) to the classifier, and generating a classification via the classifier. The classifier may generate a probability of the anomalous label (e.g., a probability that a transaction is fraudulent), in which case the interaction may be labelled as anomalous if the probability of the anomalous label is greater than a threshold value (e.g., 50%, 75%, 90%, 95%, 99%, or any other suitable value). An example of a canonicalization operations is taking the expectation value (i.e., mean) of the approximating posterior distribution produced by the encoder, rather than (or in addition to) sampling from that distribution.

In some implementations, the computing system classifies an input as anomalous or non-anomalous by determining a value associated with the probability of the interaction occurring under the generative model. This may be done, for example, by computing the log-likelihood, ELBO, or other objective function metric over the input interaction. The computing system may then be classified as anomalous or non-anomalous by determining whether that value is below a threshold. The threshold may be set by a user, e.g., to find a suitable balance of type I and type II error in the circumstances.

FIG. 7 is a flowchart of an example method 700 for detecting anomalies using a collaborative filtering VAE/classifier hybrid model. At 705, a computing system receives an interaction between two entities represented in the input space. At 710, the computing system generates a latent representation for at least one of the two entities by encoding the entities (or entity) by an encoder of a VAE portion of the collaborative filtering system. Optionally, at 715, the latent representation is canonicalized, such as by reducing an approximating posterior distribution generated by the encoder to one or more scalar values, such as a mean of the approximating posterior distribution. At 720, the latent representation, and/or its canonicalization, is passed to a classifier. At 725, the classifier generates one or more of: an anomalous classification and a non-anomalous classification for the interaction based on the latent representation (and/or its canonicalization). Optionally, at 730, the output of the classifier is reduced to an anomalous label or a non-anomalous label (and/or, optionally, another label, such as an indeterminate label) based on the classifier's classification at 725, e.g., by determining whether a probability of the anomalous and/or non-anomalous label is greater than (or less than, as appropriate) a threshold value.

FIG. 8 is a flowchart of an example method 800 for detecting fraudulent transactions on a payment network. At 805, a computing system receives information relating to a transaction on the network, including a merchant and an accountholder (e.g., a credit card owner) and optionally including additional information, such as the amount of the transaction, its location, and so on. At 810, the computing system generates a hidden representation for the merchant using a collaborative filtering system, and at 815 (which may be before, after, and/or concurrent with 810) the computing system generates a hidden representation for the merchant using the collaborative filtering system. The hidden representations may comprise, for example, hidden vectors generated by a matrix-factorization collaborative filtering system and/or latent representations generated by a VAE encoder. At 820, the hidden representations may, optionally, be canonicalized, e.g., as described above. At 825, the computing system determines a value associated with a prediction of the collaborative filtering model that such a transaction would occur (e.g., by determining an expected value of the prediction probability and/or by determining a lower bound on a loss function). Optionally, at 830, the computing system labels the transaction as fraudulent or non-fraudulent (and/or, optionally, as another label, such as indeterminate) based on the value determined at 825, e.g., by determining whether that value is greater than (or less than, as appropriate) a threshold value.

CONCLUDING GENERALITIES

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealed or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Pat. No. 9,727,824; PCT application no. US2016/057208; PCT application no. US2016/047628; PCT application no. US2016/

047627; PCT application no. US2017/15401; PCT application no. 15/561962; PCT application no. US2017/053303; U.S. patent application Ser. No. 15/725,600; U.S. provisional patent application No. 62/508,343; U.S. provisional patent application No. 62/598,880; and U.S. provisional patent application No. 62/658,461.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for training a collaborative filtering system over an input space comprising values, each value associated with a row dimension and a column dimension, the method executed by circuitry including at least one processor, the method comprising:
receiving an input row vector comprising one or more observed values associated with a first row element in the row dimension;
encoding, by a row-wise encoder of a variational autoencoder, the input row vector to an encoded row vector;
decoding, by a decoder of a variational autoencoder, a first model distribution over the input space for a first row-column pair based on the encoded row vector and a learned column vector of a set of learned column vectors, the learned column vector being a parameter of the encoder and comprising one or more learned values associated with a first column element of the first row-column pair;
determining a first loss value based on a first subset of observed values in the input space and the first model distribution; and
training one or more parameters of the variational autoencoder based on the first loss value, the training comprising training at least a subset of the learned column vectors based on the first loss value.

2. The method according to claim 1 wherein training one or more parameters of the variational autoencoder comprises training the one or more parameters based on a plurality of minibatches.

3. The method according to claim 2 wherein the plurality of minibatches comprises first and second disjoint minibatches, the first minibatch comprising a first input row vector and the second minibatch comprising a second input row vector, the first and second input row vectors each comprising observed input values for a shared element in the column dimension.

4. The method according to claim 1 further comprising:
receiving an input column vector comprising one or more observed values associated with a second column element in the column dimension;
encoding, by a column-wise encoder of a variational autoencoder, the input column vector to an encoded column vector;
decoding, by a decoder of a variational autoencoder, a second model distribution over the input space for a second row-column pair based on the encoded column vector and a learned row vector of a set of learned row vectors, the learned row vector being a parameter of the column-wise encoder and comprising one or more learned values associated with a row element of the second row-column pair;
determining a second loss value based on a second subset of observed values in the input space and the second model distribution; and
training one or more parameters of the variational autoencoder based on the second loss value, the training comprising training at least a subset of the learned row vectors based on the second loss value.

5. The method according to claim 4 further comprising assisting the training of the subset of the learned column vectors based on an output of the column-wise encoder.

6. The method according to claim 5 wherein assisting the training of the subset of the learned column vectors comprises determining the first loss value based on a regularization term, the regularization term binding the subset of the learned column vectors to the output of the column-wise encoder.

7. The method according to claim 6 wherein the regularization term comprises an L2 regularization term between the learned column vectors and the output of the column-wise encoder.

8. The method according to claim 5 wherein assisting the training of the subset of the learned column vectors comprises performing gradient descent optimization over the subset of the learned column vectors.

9. The method according to claim 8 wherein training the one or more parameters of the variational autoencoder comprises using a first training technique for the learned column vectors and a second training technique for at least one other parameter of the variational autoencoder, the second training technique based on a measurement of a gradient over time.

10. The method according to claim 4 wherein training one or more parameters of the variational autoencoder comprises alternately training the row-wise encoder and the column-wise encoder, the row-wise encoder trained based on one or more row-wise minibatches and the column-wise encoder trained based on one or more column-wise minibatches, the row-wise minibatches comprising row input vectors and the column-wise minibatches comprising column-wise input vectors.

11. The method according to claim 4 wherein the decoder is shared by the row-wise and column-wise encoders and training one or more parameters of the variational autoencoder comprises training one or more parameters of the decoder based on the first and second loss values.

12. The method according to claim 1 wherein encoding the input row vector to the encoded row vector comprises:
determining a latent distribution in a latent space of the row-wise encoder based on the input row vector; and
sampling from the latent space based on the latent distribution, thereby obtaining a sample associated with the first row element.

13. The method according to claim 12 wherein encoding the input row vector to the encoded row vector further comprises transforming the sample into the encoded row vector.

14. The method according to claim 12 wherein decoding the first model distribution comprises:
merging the encoded row vector and the learned column vector into a merged vector; and
transforming the merged vector into the first model distribution based on a prior distribution of the decoder.

15. The method according to claim 14 wherein merging the encoded row vector and learned column vector comprises performing a linear transformation of the encoded row vector and learned column vector.

16. The method according to claim 14 wherein transforming the merged vector into the first model distribution comprises providing the merged vector to a neural network as input and receiving the first model distribution as output.

17. The method according to claim 12 wherein the latent space comprises a restricted Boltzmann machine.

18. The method according to claim 17 wherein sampling from the latent space comprises representing the restricted Boltzmann machine in a topological quantum processor, executing the quantum processor to determine a sample output, and obtaining the sample based on the sample output.

19. The method according to claim 1 wherein each element of the row dimension corresponds to a user, each element of the column dimension corresponds to an item ratable by the user; each value of the input space corresponds to a rating for a user-item pair; receiving an input row vector comprising one or more observed values associated with a first row element comprises receiving an input user vector comprising one or more observed values characterizing a user; and decoding a first model distribution over the input space for a first row-column pair based on a learned column vector comprises decoding a first model distribution over the input space for a first user-item pair, the learned column vector comprising one or more learned values associated with a first item element of the first user-item pair.

20. A system for collaborative filtering over an input space comprising values, each value associated with a row dimension and a column dimension, the system comprising at least one processor and at least one nontransitory processor-readable storage medium that stores at least one of processor-executable instructions or data which, when executed by the at least one processor, cause the at least one processor to:
  receive an input row vector comprising one or more observed values associated with a first row element in the row dimension;
  encode, by a row-wise encoder of a variational autoencoder, the input row vector to an encoded row vector;
  decode, by a decoder of a variational autoencoder, a first model distribution over the input space for a first row-column pair based on the encoded row vector and a learned column vector of a set of learned column vectors, the learned column vector being a parameter of the encoder and comprising one or more learned values associated with a first column element of the first row-column pair;
  determine a first loss value based on a first subset of observed values in the input space and the first model distribution; and
  train one or more parameters of the variational autoencoder based on the first loss value, the training comprising training at least a subset of the learned column vectors based on the first loss value.

* * * * *